United States Patent
Watanabe et al.

(10) Patent No.: US 7,280,915 B2
(45) Date of Patent: Oct. 9, 2007

(54) NAVIGATION DEVICE AND METHOD OF PRESENTING INFORMATION CORRESPONDING TO TRAVEL COURSE STAGE

(75) Inventors: Masaki Watanabe, Yokohama (JP); Fumio Seto, Yokosuka (JP); Hirofumi Inoue, Yokosuka (JP); Toshiaki Takahashi, Yokohama (JP); Okihiko Nakayama, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 239 days.

(21) Appl. No.: 11/105,374

(22) Filed: Apr. 14, 2005

(65) Prior Publication Data
US 2005/0267680 A1 Dec. 1, 2005

(30) Foreign Application Priority Data
May 31, 2004 (JP) ............................ P2004-162227

(51) Int. Cl.
G06G 7/78 (2006.01)
(52) U.S. Cl. ...................................... 701/209; 340/988
(58) Field of Classification Search ................ 701/200, 701/207, 208; 73/178 R; 342/357.13, 357.07, 342/357.08; 340/988, 990, 992, 995.1
See application file for complete search history.

(56) References Cited

U.S. PATENT DOCUMENTS 5,541,845 A * 7/1996 Klein ......................... 701/207
5,808,565 A * 9/1998 Matta et al. ................. 340/994
5,974,356 A * 10/1999 Doyle et al. ................. 701/209
6,037,881 A * 3/2000 Bornhauser et al. ........ 340/994
2006/0106534 A1* 5/2006 Kawamata et al. ......... 701/208

FOREIGN PATENT DOCUMENTS

JP 2001-227968 8/2001

* cited by examiner

Primary Examiner—Dalena Tran
(74) Attorney, Agent, or Firm—McDermott Will & Emery LLP

(57) ABSTRACT

A CPU of a navigation device includes a clock unit, a continuous driving time measurement unit that measures continuous driving time from a traveling start time, a course stage prediction unit, and a presenting information controller. The course stage prediction unit selects based on the traveling start time, a first transition determination reference time for transition from a "first stage" to a "middle stage" from prepared data of the first transition determination reference time and a second transition determination reference time for transition from the "middle stage" to a "last stage" from prepared data of the second transition determination reference time. The course stage prediction unit then predicts a course stage by comparing the continuous driving time with the selected transition determination reference times. Depending on the predicted course stage, the presenting information controller presents information convenient for a driver in the predicted course stage.

14 Claims, 13 Drawing Sheets

FIG. 2

| TRAVELING START TIME | EXPECTED AMOUNT OF REQUIRED TIME IN EACH COURSE STAGE | | | | REFERENCE TIME FOR DETERMINING COURSE STAGE TRANSITION (COUNTED FROM TRAVELING START TIME) | | EXPECTED TRAVELING END TIME |
|---|---|---|---|---|---|---|---|
| | FIRST STAGE | MIDDLE STAGE | LAST STAGE | (TOTAL) | FIRST STAGE → MIDDLE STAGE | MIDDLE STAGE → LAST STAGE | |
| 0:00 – 2:00 | 2 HOUR | 5 HOUR | 1 HOUR | (8) | 2 HOUR | 7 HOUR | SAME MINUTES BETWEEN 8:00AM AND 10:00AM |
| 2:00 – 4:00 | 1.5 HOUR | 4.5 HOUR | 1 HOUR | (7) | 1.5 HOUR | 6 HOUR | SAME MINUTES BETWEEN 9:00AM AND 11:00AM |
| 4:00 – 6:00 | 1.5 HOUR | 3.5 HOUR | 1 HOUR | (6) | 1.5 HOUR | 5 HOUR | SAME MINUTES BETWEEN 10:00AM AND 12:00PM |
| 6:00 – 16:00 | 1 HOUR | 2.5 HOUR | 1.5 HOUR | (5) | 1 HOUR | 3.5 HOUR | SAME MINUTES BETWEEN 11:00AM AND 9:00PM |
| 16:00 – 19:00 | 1 HOUR | 2 HOUR | 1 HOUR | (4) | 1 HOUR | 3 HOUR | SAME MINUTES BETWEEN 8:00PM AND 11:00PM |
| 19:00 – 21:00 | 1 HOUR | 1.5 HOUR | 0.5 HOUR | (3) | 1 HOUR | 2.5 HOUR | SAME MINUTES BETWEEN 10:00PM AND 0:00AM |
| 21:00 – 22:00 | 2 HOUR | 2 HOUR | 1 HOUR | (5) | 2 HOUR | 4 HOUR | SAME MINUTES BETWEEN 2:00AM AND 3:00AM |
| 22:00 – 23:00 | 2 HOUR | 3 HOUR | 1 HOUR | (6) | 2 HOUR | 5 HOUR | SAME MINUTES BETWEEN 4:00AM AND 5:00AM |
| 23:00 – 0:00 | 2 HOUR | 4 HOUR | 1 HOUR | (7) | 2 HOUR | 6 HOUR | SAME MINUTES BETWEEN 6:00AM AND 7:00AM |

NAVIGATION DEVICE AND METHOD OF PRESENTING INFORMATION CORRESPONDING TO TRAVEL COURSE STAGE

BACKGROUND OF THE INVENTION

The present invention relates to a navigation device and, more particularly, to a navigation device that can present information corresponding to a travel course stage of a vehicle.

There has been known navigation devices that control presentation of information according to a travel course stage of a vehicle, such as a first stage, a middle stage, and a last stage, as disclosed in Japanese Patent Application Laid-Open No. 2001-227968. Such navigation devices automatically establish the "first stage", the "middle stage", and the "last stage" between a departure point and a destination point on a guidance route set by a driver, and also automatically establish many rest points in the "middle stage" or the "last stage" in which driver's fatigue reaches a higher level, thereby indicating information about these rest points to the driver.

There are also demands from users that a type or frequency of information presented to the driver from a display or a speaker of the navigation device is changed depending on the "first stage", the "middle stage", and the "last stage" so that information useful for the driver of each stage can be provided at an appropriate frequency. For example, in the "first stage" in which road guidance is not so necessary, general information such as traffic and sightseeing information covering a wide area is desirably preferentially presented rather than guidance information of the area to which each branch road leads. In the "middle stage", geographical names of places of relatively large areas that are expected to be generally well known are desirably presented as the name of a destination of the road on which the vehicle is running and as the geographical name of the area to which each branch road leads. In the "last stage", more detailed guidance information of the names of places or facility spots around a current position is desirably presented.

SUMMARY OF THE INVENTION

The conventional technique has, however, a precondition that a driver sets a destination and a guidance route. The destination and guidance route settings are necessary when the driver requires proper route guidance to the destination, but there are some cases where the driver drives a vehicle with the navigation device remaining displaying an area around the current position because, for example, the driver does not need route guidance of the navigation device as the driver has been near the destination before or the driver omits troublesome operations for setting the destination. In this case, the navigation device cannot predict whether the current position corresponds to the "first stage", the "middle stage", or the "last stage" in the current travel course because the destination and the guidance route are not set for the navigation device.

In order to solve the above problem and to meet the demand from the drivers, the present invention has an object to provide a navigation device that automatically predicts which stage of a travel course the vehicle is traveling in, and presents information corresponding to the course stage, even when destination and guidance route settings are not made.

Thus, the navigation device according to the present invention acquires at least one of the following information of parameters indicating a current traveling state of the vehicle: time elapsed from departure, a distance from a departure point, size of the road on which the vehicle is currently traveling, and change in a traveling direction. The navigation device then predicts based on the acquired information of parameters indicating the vehicle traveling state, whether the vehicle is in the "first stage", the "middle stage", or the "last stage" in the travel course, thereby presenting information to passengers according to the predicted course stage.

According to the navigation device of the present invention, even when the driver does not set the destination and the guidance route for the navigation device, the navigation device automatically predicts based on the information of parameters indicating the current traveling state of the vehicle, whether the vehicle is in the "first stage", the "middle stage", or the "last stage" of a travel course, and then presents information corresponding to the course stage, thereby presenting to even a person inexperienced in operations of the navigation device, information useful for the driver and also corresponding to the course stage at appropriate times during driving some long distance.

BRIEF DESCRIPTION OF THE DRAWINGS

FIG. 2 is a diagram showing reference time period for determining traveling stage transition which is shown for each of different traveling start times;

DETAILED DESCRIPTION OF THE PREFERRED EMBODIMENTS

Preferred embodiments of the present invention will be explained below by way of examples.

Figure 1:
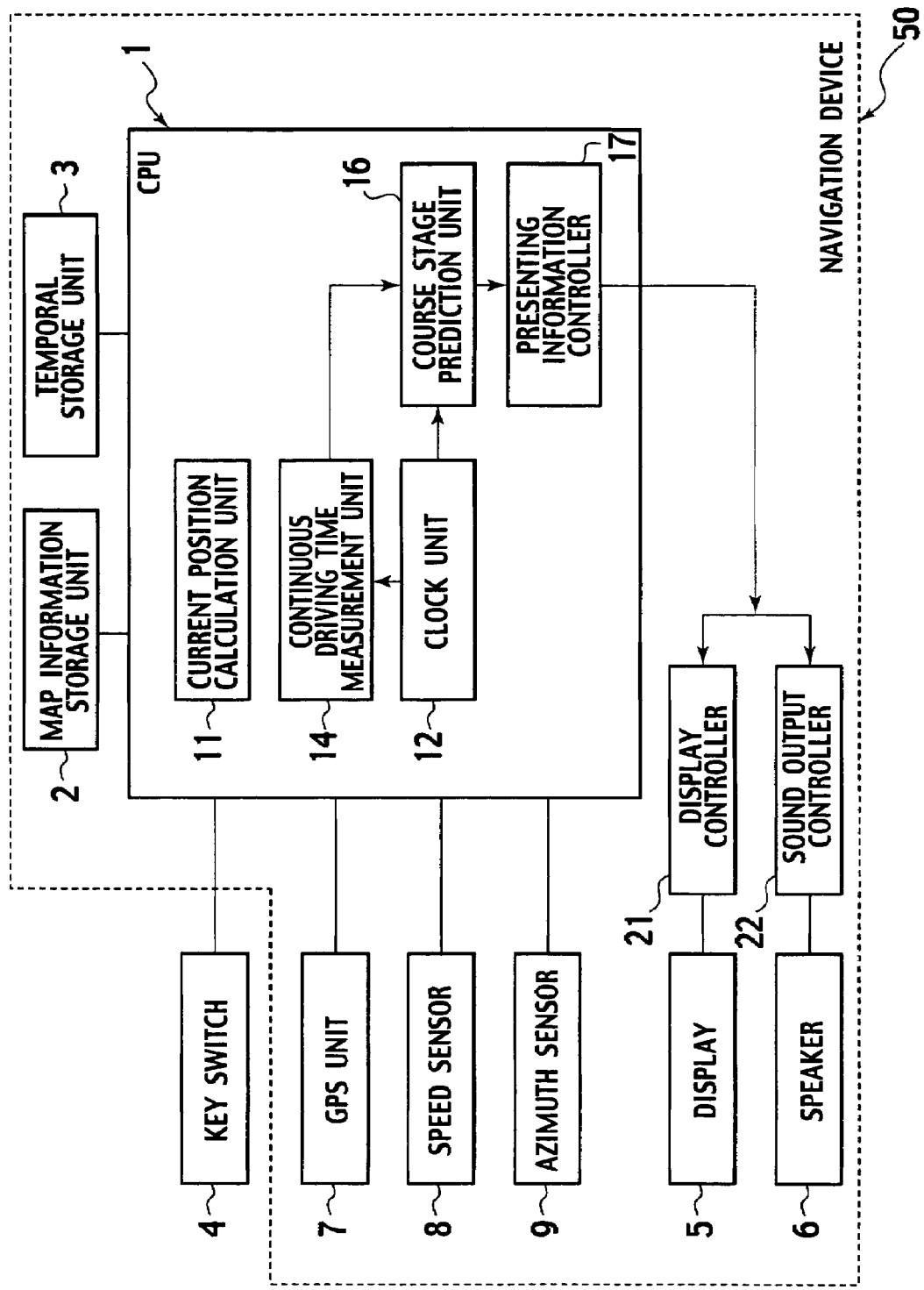
FIG. 1 is a diagram showing a configuration of a navigation device according to a first embodiment of the present invention.

FIG. 1 is a block diagram showing a configuration of a navigation device according to a first embodiment.

The navigation device includes a GPS unit 7 that calculates absolute position coordinates and azimuth on the ground by radio waves received from a GPS satellite, a speed sensor 8 that detects the rotational speed of a wheel, an azimuth sensor 9 that detects a relative traveling direction of the vehicle by using a sensor such as a gyro-sensor, a CPU 1, and peripheral circuits thereof including a display controller 21, a sound output controller 22, a map information storage unit 2, a temporal storage unit 3, a display 5, a speaker 6, and an input unit (not shown).

The CPU 1 controls the entire navigation device, and has a current position calculation unit 11, a clock unit 12, a continuous driving time measurement unit 14, a course stage prediction unit 16, and a presenting information controller 17, all of which perform their processing on a software basis. Furthermore, the CPU 1 is connected to the display controller 21, the sound output controller 22, the map information storage unit 2, the temporal storage unit 3, the GPS unit 7, the speed sensor 8, the azimuth sensor 9, and a key switch 4.

The display controller 21 performs control for making the display 5 display and output display information sent from the CPU 1. The sound output controller 22 converts sound output information sent from the CPU 1 to sound signals and outputs them to the speaker 6. The temporal storage unit 3 is, for example, a flash memory, and stores a traveling start time when ignition is turned ON by the key switch 4 and a traveling end time immediately before the ignition is turned OFF by the key switch 4. The temporal storage unit 3 also stores criteria data used when the course stage prediction unit 16 predicts whether the vehicle is in a "first stage", a "middle stage", or a "last stage" of the travel course.

The display 5 is connected to the display controller 21 and displays an operational menu screen and a road map for an operator. That is, the display 5 displays the operational menu screen when the operator makes destination search and setting and route search and setting, and displays road guidance while the vehicle is running. The speaker 6 is connected to the sound output controller 22, and provides vocal help guidance for making various manipulations to the navigation device and also provides vocal road guidance.

The input unit (not shown) has various button switches used for destination search and setting, route search and setting, change of the scale of the displayed map, display of a menu screen, and selecting of items on the menu screen. The map information storage unit 2 is, for example, a hard disk drive unit, and stores map information which includes road map data for displaying road maps graphically on the displays, road information data including traffic control data necessary for route searches such as one-way or passage-prohibition data, address data of each spot, and registration spot data necessary for destination search or spot registration.

The road information data contains road link data that indicates, with road links and nodes, road connections necessary to provide road guidance along a setting route and to make a route search. This road link data is assigned with a link ID, and contains data of a road type (e.g., highway, national road, prefectural road, municipal road, farm road), road attribute (relation such that the road link is attributed to a particular road, e.g., National Road Route-1), link distance (length of the road link), link travel time (time required to travel the road link), road width or the number of lanes, node coordinates (map coordinates at start and end points of the road link (latitude and longitude coordinates)), IDs of neighboring links connected to the start and end points of the road link, and the like.

Processing functions of the CPU 1 are explained below.

The current position calculation unit 11 calculates a current position and a traveling direction of the vehicle based on the latitude and longitude coordinates periodically obtained from the GPS unit 7, the road information data stored in the map information storage unit 2, and information obtained from the speed sensor 8 and the azimuth sensor 9.

The clock unit 12 has a clock function of continuously counting time by using a backup battery even when the navigation device is in an OFF state. The clock unit 12 outputs the current time to the continuous driving time measurement unit 14 and the course stage prediction unit 16. The continuous driving time measurement unit 14 measures a period of time elapsed from a traveling start time using the traveling start time and the current time.

The course stage prediction unit 16 predicts, based on predetermined criteria having continuous driving times and traveling start times as a parameter, whether the vehicle is currently in the "first stage", the "middle stage", or the "last stage" of the travel course. This criteria data is stored in the temporal storage unit 3.

FIG. 2 shows an example of the criteria.

In the first column on the left, various cases of the "traveling start time" are listed, and as shown in the second column from the left which is "expected amount of required time in each course stage", the expected amount of required time in each course stage of the "first stage", the "middle stage", and the "last stage" is predetermined. In the third column from the left which is "reference time period for determining course stage transition", a reference time period for determining course stage transition is set which is counted from the traveling start time based on the above expected amount of required time in each course stage. A reference time period for determining transition from the "first stage" to the "middle stage" is called a first transition determination reference time, and a reference time period for determining transition from the "middle stage" to the "last stage" is called a second transition determination reference time. In the rightmost column, expected traveling end times are indicated for reference.

It is allowable that course stage transition is determined simply based on a predetermined elapsed time period irrespective of the traveling start time, however, in the present embodiment, the course stage transition determination reference time is changed depending on the traveling start time. This is because many drivers plan to arrive at the destination on the same day as the departure and thus calculates the traveling start time from the expected amount of required time in most cases. Therefore, the expected amount of required time is assumed to be longer as the traveling start time is early in the morning, and is assumed to be shorter as the traveling start time is late.

For example, when the traveling start time is between 6:00 AM and 4:00 PM, it is expected that it takes 5 hours to travel the entire travel course and that the traveling ends between 11:00 AM and 9:00 PM. The detailed expected amount of required time for each course stage is 1 hour in the "first stage", 2 and a half hours in the "middle stage", and 1 and a half hours in the "last stage". The course stage is determined to be shifted from the "first stage" to the "middle stage" when 1 hour passes since the traveling start time, and thereafter shifted from the "middle stage" to the "last stage" when 3 and a half hours pass since the traveling start time. Therefore, when the traveling start time is between 6:00 AM and 4:00 PM, these values of 1 hour, and 3 and a half hours are used as the first and the second transition determination reference times, respectively, in the course stage prediction unit 16.

For example, when the traveling start time is between 7:00 PM and 9:00 PM, it is expected that it takes 3 hours to travel the entire travel course and that the traveling ends between 10:00 PM and 0:00 AM. The detailed expected amount of required time for each stage is 1 hour in the "first stage", 1 and a half hours in the "middle stage", and half an hour in the "last stage". Therefore, 1 hour, and 2 and a half hours since the traveling start time are used as the first and the second transition determination reference times, respectively, in the course stage prediction unit 16.

Contrary to this, when departure is early or before sunrise, the course stage transition determination reference time is set on the assumption that amount of required time to travel the entire travel course is long and that the driver departs early on the purpose of arriving in the morning. For example, when the traveling start time is between 0:00 AM and 2:00 AM, it is expected that it takes 8 hours to travel the entire course and the traveling ends between 8:00 AM and 10:00 AM. The detailed expected amount of required time for each stage is 2 hours in the "first stage", 5 hours in the "middle stage", and 1 hour in the "last stage", and therefore 2 hours and 7 hours since the traveling start time are used as the first and the second transition determination reference times, respectively, in the course stage prediction unit 16.

In this manner, the expected amount of required time to travel the entire travel course is changed depending on the traveling start time, and the expected amount of required time for each course stage is also changed depending thereon. For departures after 9:00 PM in FIG. 2, exceptional course stage transition determination reference time is set in contrast to the concept described above.

Such setting is made because, when the traveling start time is very late at night, it is highly probable that the driver plans to drive over the next day. For example, when the traveling start time is between 10:00 PM and 11:00 PM, the driver may plan to arrive at the destination within 2 hours, but there is another possibility that the driver plans to drive throughout the night to arrive early in the next morning.

When the traveling start time is after 9:00 PM (between 9:00 PM and 10:00 PM, between 10:00 PM and 11:00 PM, or between 11:00 PM and 0:00 AM), the amount of required time to travel the entire travel course is expected to be long, and similarly to the case of early departure, the detailed expected amount of required time for each course stage is 2 hours in the "first stage", 2 hours or more (2, 3, or 4 hours) in the "middle stage", and 1 hour in the "last stage". Therefore, 2 hours and 4 hours or more (4, 5, or 6 hours) since the traveling start time are used as the first and the second transition determination reference times, respectively, in the course stage prediction unit 16.

This long time period of 2 hours set for the "first stage" allows transition from the "first stage" to the "middle stage" only after a certain length of continuous driving time. Therefore, in the case of short driving time within 2 hours, for example, the traveling consequently ends in the "first stage", so that control for presentation of information specific to the "middle stage" is not performed.

The course stage prediction unit 16 calculates elapsed time from a difference between the traveling end time stored immediately before the engine is stopped for the last time and the current time when the engine is now started, and determines whether a short-term stop is made and thus a travel course now started is continuous with the previous travel course.

The presenting information controller 17 outputs image information to the display controller 21 so as to display information, such as the current position of the vehicle and a surrounding area map, as a computer graphic road map on the display 5 as necessary according to the current position of the vehicle. At this time, the presenting information controller 17 switches information to be presented according to the "first stage", the "middle stage", or the "last stage" that is predicted by the course stage prediction unit 16.

The CPU 1 has the functions installed in typical on-vehicle navigation devices, such as a destination search and setting function, a route search and setting function of searching for and setting a route to a set destination, a spot registration function of registering spots in advance that are frequently set as a destination, and a road guidance function of leading the driver to the set route. A navigation device 50 of the present invention automatically starts when the key switch 4 is turned ON, and stops in response to an ON to OFF transition of the key switch 4.

Next, a control flow for presenting information corresponding to a course stage according to the present embodiment will be explained.

The navigation device 50 first starts when the key switch 4 is turned ON, whereupon the CPU 1 detects the ignition ON.

In step 101, the course stage prediction unit 16 acquires the current time from the clock unit 12.

In step 102, the course stage prediction unit 16 acquires a previous traveling start time and a previous traveling end time from the temporal storage unit 3.

In step 103, the course stage prediction unit 16 determines time elapsed now since the acquired previous traveling end time, and checks whether a predetermine period of time or more has passed. For example, when the elapsed time is 1 hour or more, the course stage prediction unit 16 determines that the traveling now started is new, and then the process proceeds to step 104 in which the course stage prediction unit 16 sets the current time to a new traveling start time and stores this traveling start time in the temporal storage unit 3. After the step 104 is performed, the process proceeds to step 106.

When the elapsed time is less than 1 hour, the course stage prediction unit 16 determines that a rest is taken in the middle of the travel course, and the process proceeds to step 105 in which the course stage prediction unit 16 remains holding the previous traveling start time acquired from the temporal storage unit 3 as a traveling start time. The flow then proceeds to step 106.

In step 106, the course stage prediction unit 16 determines which of the course stage transition determination reference times is to be used, based on the traveling start time set in the step 104 or 105 and the criteria data shown in FIG. 2.

In step 107, the continuous driving time measurement unit 14 acquires the current time at every moment from the clock unit 12 to calculate a continuous driving time elapsed since the traveling start time.

In step 108, the course stage prediction unit 16 predicts whether the present course stage is the "first stage", the "middle stage", or the "last stage", according to the course stage transition determination reference time determined in step 106.

In step 109, the presenting information controller 17 presents information corresponding to the course stage predicted in step 108 to the driver by using the display 5 and the speaker 6.

Figure 4:
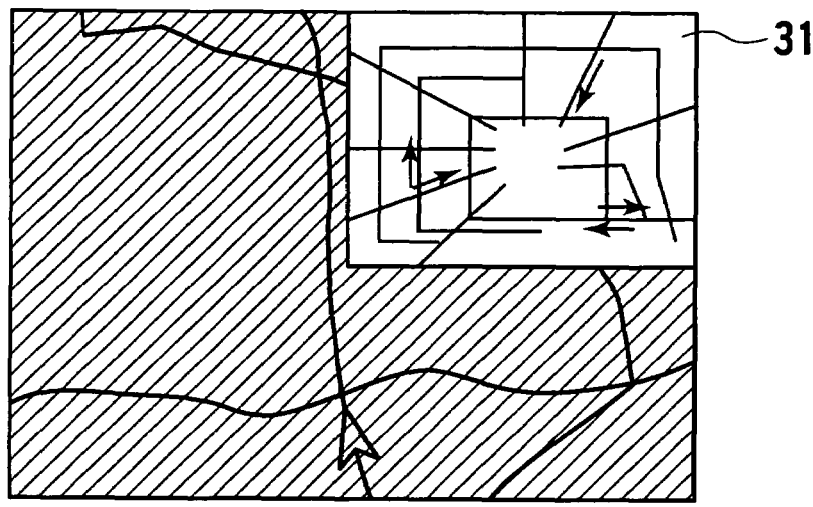
FIG. 4 is a view showing an example of presenting information corresponding to a course stage of a "first stage"

Next, examples of presenting to the driver the information corresponding to a course stage will be explained with reference to FIGS. 4 to 6.

For example, in the "first stage" of the travel course, the drivers desire to see wide-area traffic information that allows them to easily and roughly know what route to take for advancing on the entire travel course, rather than local road guidance information provided by display of a road map of the area around the current position which helps the drivers to determine which way exactly to go. Therefore, as shown in FIG. 4, on the road map of the area around the current position displayed on the display 5, wide-area traffic information 31 is superimposed at, for example, the top right corner of the screen of the display 5.

When the vehicle travels without any destination and guidance route settings with a surrounding area map of the current position being displayed, the "middle stage" is a stage in which the vehicle is simply advancing toward the destination, so the navigation device 50 displays information indicating areas to which roads crossing the intersection ahead lead.

In this "middle stage", however, there may still remain much distance to the destination. Therefore, when very local geographical names are displayed, the driver does not easily recognize them. Accordingly, geographical names known to some extent or names of wide areas, such as those familiar with the drivers, are displayed.

Figure 5:
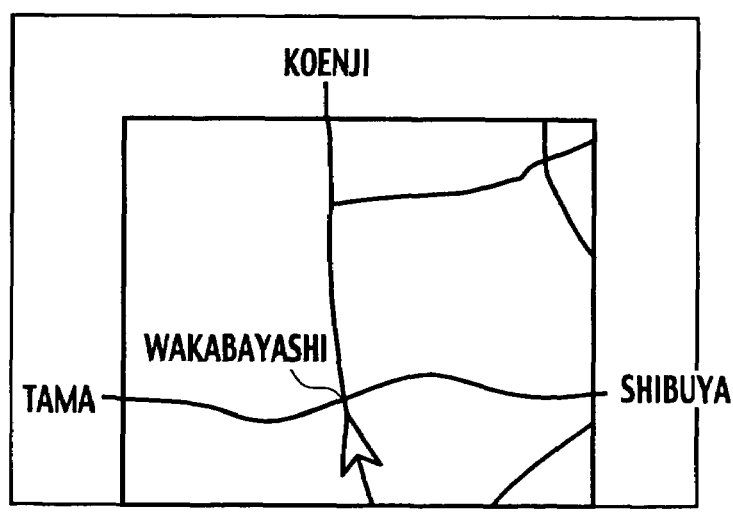
FIG. 5 is a view showing an example of presenting information corresponding to a course stage of a "middle stage"
Figure 6:
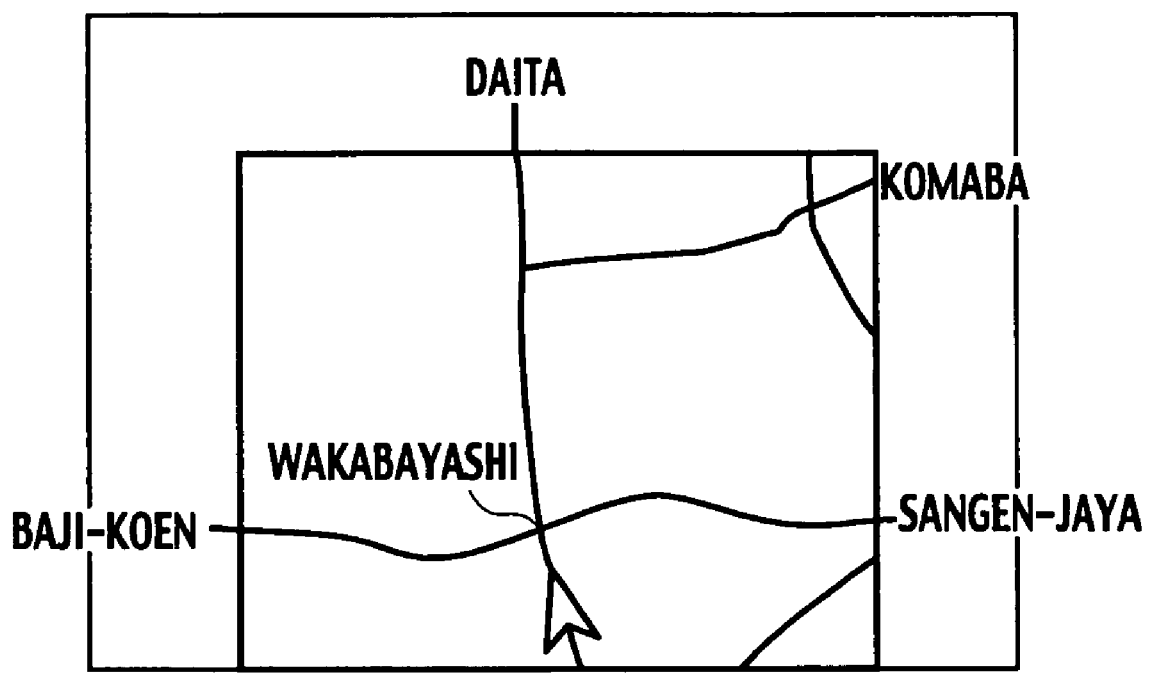
FIG. 6 is a view showing an example of presenting information corresponding to a course stage of a "last stage"

For example, when the vehicle is traveling north along Kan-nana street toward the intersection of Wakabayashi as shown in FIG. 5, the area information such as "Koenji" for straight ahead, "Tama" for left-turn, and "Shibuya" for right-turn is displayed on the extension of each corresponding road extending from the intersection of Wakabayashi, at an edge portion of the screen of the display 5.

In the "last stage", more detailed geographical names or known given names on the displayed roads are indicated as the area information so that the driver can clearly recognize the destination.

For example, when the vehicle is traveling north along Kan-nana street toward the intersection of Wakabayashi, more detailed or specific area information such as "Daida" for straight ahead, "Baji-Koen" for left-turn, and "Sangen-Jaya" for right-turn is displayed on the extension of each corresponding road extending from the intersection of Wakabayashi, at the edge portion of the screen of the display 5.

In step 110, the course stage prediction unit 16 writes the current time obtained from the clock unit 12 as a provisional traveling end time into the temporal storage unit 3.

In step 111, the CPU 1 checks whether the ignition is turned OFF by the key switch 4. When the ignition is turned OFF, the navigation device 50 is stopped. When the ignition is not turned OFF, the process returns to step 107, and a series of course stage prediction processes and the control for presenting information corresponding to the predicted course stage to the driver are continued. When the navigation device 50 is stopped as the ignition is turned OFF, the provisional traveling end time written into the temporal storage unit 3 in step 110 is used as a proper traveling end time.

In the flowchart of the present embodiment, the step 107 constitutes traveling state acquisition means of the present invention, the step 110 constitutes traveling end time storage means of the present invention, and the steps 102 to 106, and step 108 constitute course stage prediction means of the present invention.

As described above, according to the present embodiment, even when the vehicle runs a long distance without setting any guidance route with a road map around the current position being displayed, the navigation device can automatically predict that the course stage is the "first stage", the "middle stage", or the "last stage", and can switchably control information to be presented by the display 5 or the speaker 6 according to the driver's convenience at each course stage. Therefore, even when the driver cannot make destination or route settings because of troublesome operations therefor or when the driver does not make route setting because the driver has once been near the destination of this time, information is presented in a controlled manner based on the automatic prediction of the course stage, which conveniently eliminates troublesome operations by the driver to switch contents of displayed information.

Furthermore, according to the present embodiment, several sets of the course stage transition determination reference times dependent on the traveling start time are prepared in a form of a table, in which the expected amount of required time particularly in the "middle stage" is set longer as departure is earlier in the morning. The course stage is shifted according to continuous driving time from the "first stage" to the "middle stage" and from the "middle stage" to the "last stage", thereby allowing the course stage prediction properly reflecting driver's behavior of departing earlier for further destinations.

Moreover, when the ignition is turned ON after a short-term stop, the course stage prediction unit 16 determines that the short-term stop is made, based on the time elapsed from the previous traveling end time to the current time, and the continuous driving time measurement unit 14 uses the previous traveling start time to calculate the continuous driving time, which thus does not affect the traveling stage prediction even when the driver stops by a convenience store immediately after the departure or takes a rest in the middle of the travel course.

Next, a second embodiment of the present invention will be explained.

Figure 7:
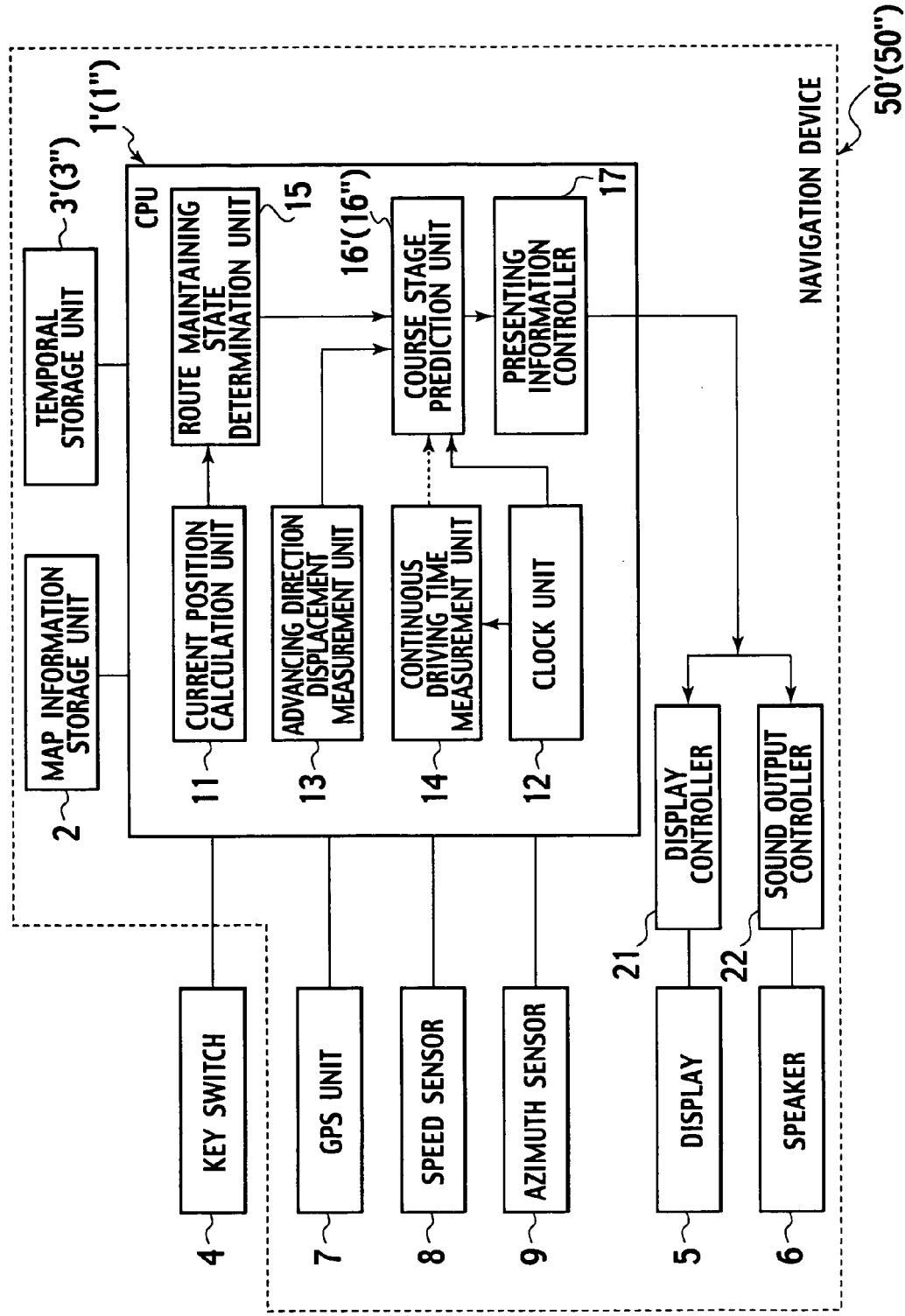
FIG. 7 is a diagram showing a configuration of a navigation device according to a second embodiment of the present invention.

FIG. 7 is a block diagram showing a configuration of a navigation device according to the second embodiment.

A navigation device 50' according to the second embodiment has a CPU 1' and a temporal storage unit 3' that are different from those in the first embodiment. The CPU 1' includes the components described in the first embodiment and additionally includes an advancing direction displacement measurement unit 13 and a route maintaining state determination unit 15. Also, the continuous driving time measurement unit 14 is eliminated, and the course stage prediction unit 16 is replaced with a course stage prediction unit 16'.

Like parts as in the first embodiment are designated with like reference signs, therefore, descriptions therefor will be omitted, but the CPU 1 is rewritten as the CPU 1', the temporal storage unit 3 as the temporal storage unit 3', the course stage prediction unit 16 as the course stage prediction unit 16', and the navigation device 50 as the navigation device 50', in the present embodiment.

The temporal storage unit 3, stores a time immediately before the ignition is turned OFF by the key switch 4 as a traveling end time, and also stores a travel course stage set by the course stage prediction unit 16'. The temporal storage unit 3' also stores data of an advancing azimuth angle φ sampled by the advancing direction displacement measurement unit 13, data of a displacement angle θ that is a difference between two advancing azimuth angles φ, and values of an arterial road traveling counter counted by the route maintaining state determination unit 15. Here, a memory area for storing the advancing azimuth angle φ data and displacement angle θ data is called a buffer. The temporal storage unit 3' further stores a criterion θo for the displacement angle that is used by the course stage prediction unit 16' and a criterion No for the value of the arterial road traveling counter.

The advancing direction displacement measurement unit 13 samples the advancing azimuth angle φ of the vehicle in a predetermined cycle in response to a signal from the GPS unit 7 and the azimuth sensor 9, and then stores a predetermined number of pieces of data of the advancing azimuth angle φ in the buffer. Every time new advancing azimuth angle φ data is written into the buffer, the oldest sampled value is deleted from the buffer. The advancing direction displacement measurement unit 13 calculates the displacement angle θ indicative of a difference between two advancing azimuth angles φ stored in time sequence order at every sampling time of the advancing azimuth angle φ, and then stores the calculated displacement angle θ in the buffer.

The route maintaining state determination unit 15 acquires positional coordinates from the current position calculation unit 11, retrieves road link data in the map information storage unit 2, specifies a road link on which the vehicle is currently traveling, determines based on the road type of the retrieved road link data, whether the vehicle is traveling on a road of a predetermined size or larger, measures arterial road traveling time during which the vehicle is traveling on the road of the predetermined size or larger, and writes the measured time as a count value into the temporal storage unit 3'. Roads of the predetermined size or larger here include a wide road such as a highway and a primary national road, and roads smaller than the predetermined size here includes municipal and country roads smaller than prefectural roads. In the present embodiment, the arterial road traveling time is measured by determining whether the vehicle is traveling on a road of the predetermined size or larger, and repeatedly incrementing the arterial road traveling counter while a road of the predetermined size or larger is detected, but clearing the arterial road traveling counter to zero when a road smaller than the predetermined size is detected.

The course stage prediction unit 16' calculates the elapsed time from a difference between the traveling end time stored immediately before the ignition is turned OFF for the last time and the current time when the ignition is now turned ON, and determines whether a new travel course is started or a short-term stop is made. The course stage prediction unit 16' also predicts whether the course stage is the "first stage", the "middle stage", or the "last stage", according to an average value of the absolute values of the displacement angles θ in a predetermined period of time that is calculated by the advancing direction displacement measurement unit 13 and the value of the arterial road traveling counter counted by the route maintaining state determination unit 15.

The course stage prediction unit 16' automatically sets a travel course stage to the "first stage" when the vehicle starts traveling, and predicts that the course stage is shifted to the "middle stage" when changes in the advancing azimuth angle φ are small and the vehicle is continuously traveling on a road of the predetermined size or larger.

In the "middle stage", when changes in the advancing azimuth angle φ are continuously large, and at the same time, when the vehicle is traveling intermittently on a road of the predetermined size or larger or is traveling on a road smaller than the predetermined size, the course stage prediction unit 16' predicts that the course stage is shifted to the "last stage". This predictive determination is made based on whether an average value <|θ|> of the absolute values of the displacement angles θ periodically calculated and stored in time sequence order into the buffer by the advancing direction displacement measurement unit 13 is a predetermined value θo or smaller, and also whether the value of the arterial road traveling counter indicating whether the vehicle is continuously traveling on a road of the predetermined size or larger is a predetermined value No or larger.

The concept of the above prediction will be explained below.

When the travel course has a certain length of distance, the driver often takes wide roads with fewer curves where the driver can travel at relatively high speed, such as a highway or a primary national road. However, except for special cases, it is rare to take such a wide road from immediately after the departure to immediately before the arrival at the destination. Usually, the vehicle runs on small roads (e.g., country road, municipal road, or principal road) for some time immediately after the departure while changing the advancing direction at a certain frequency, until reaching an interchange of a highway or a junction with a national road. Thereafter, the vehicle runs on the highway or the national road to advance a great distance, then shifts to a small road again when the destination is nearby, and finally reaches the destination while changing the advancing direction at a certain frequency.

In the present embodiment, when the vehicle is traveling on a wide road, the vehicle is in the "middle stage", and the preceding and subsequent stages are the "first stage" and the "last stage", respectively. Accordingly, large changes in the advancing direction after the departure mean that the vehicle is still in the "first stage", and small changes in the advancing direction at the "first stage" mean that the course stage is shifted to the "middle stage". Large changes in the advancing direction after the course stage is shifted to the "middle stage" mean that the course stage is shifted to the "last stage".

Since changes in the advancing direction are not always large when the vehicle is running in an urban area at the "first stage" and the "last stage", the prediction of the "first stage" and the "last stage" is made by also referring to the road size. That is, when the vehicle is traveling on a small size road after the departure, the course stage is still the "first stage". When the vehicle is traveling on a wide road in the "first stage", this means that the course stage is shifted to the "middle stage". When the vehicle is traveling again on a small size road after the course stage is shifted to the "middle stage", this means that the course stage is shifted to the "last stage".

Figure 8:
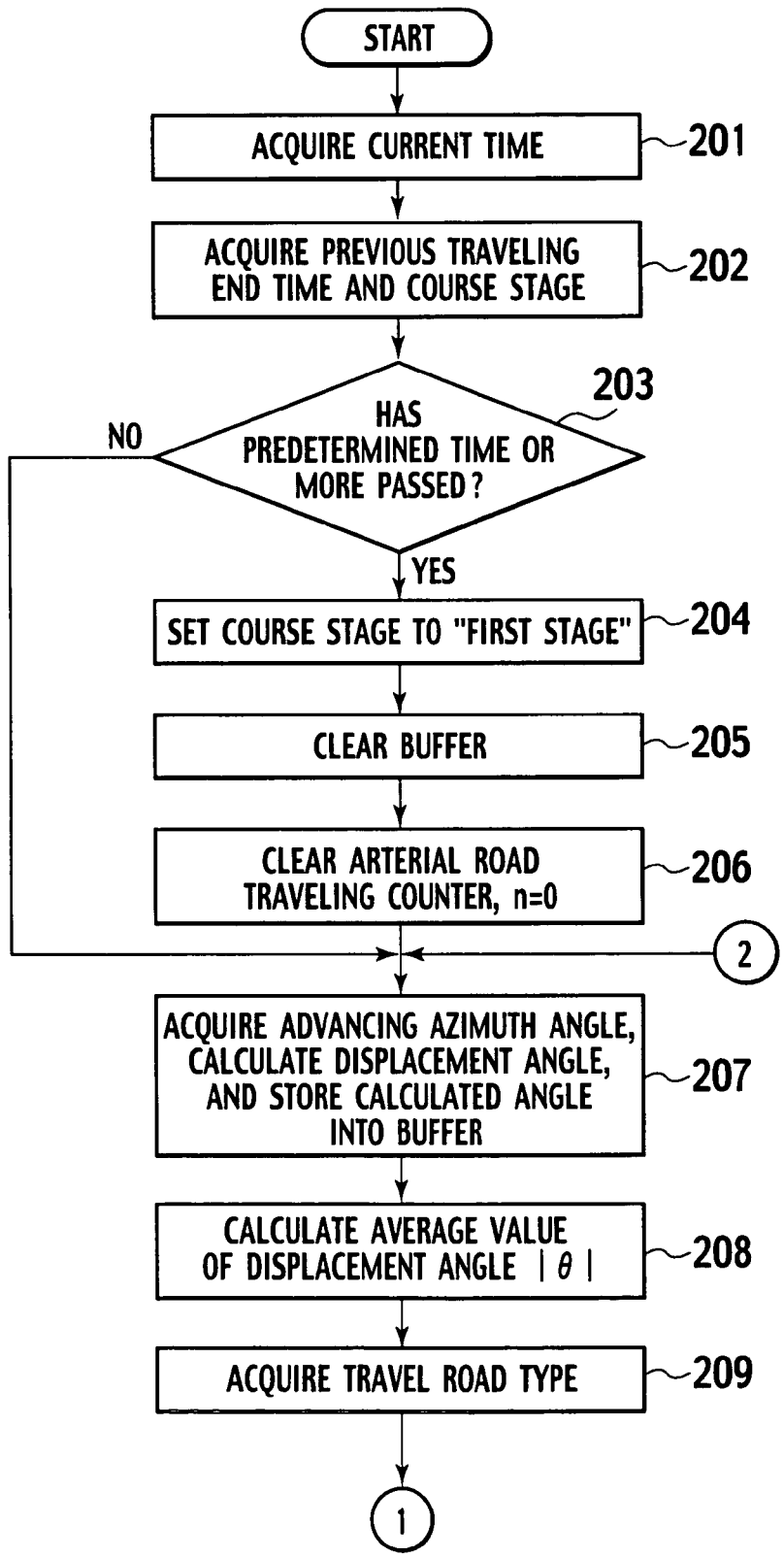
FIG. 8 is a flowchart showing a control flow of presenting information corresponding to a course stage according to the second embodiment.
Figure 9:
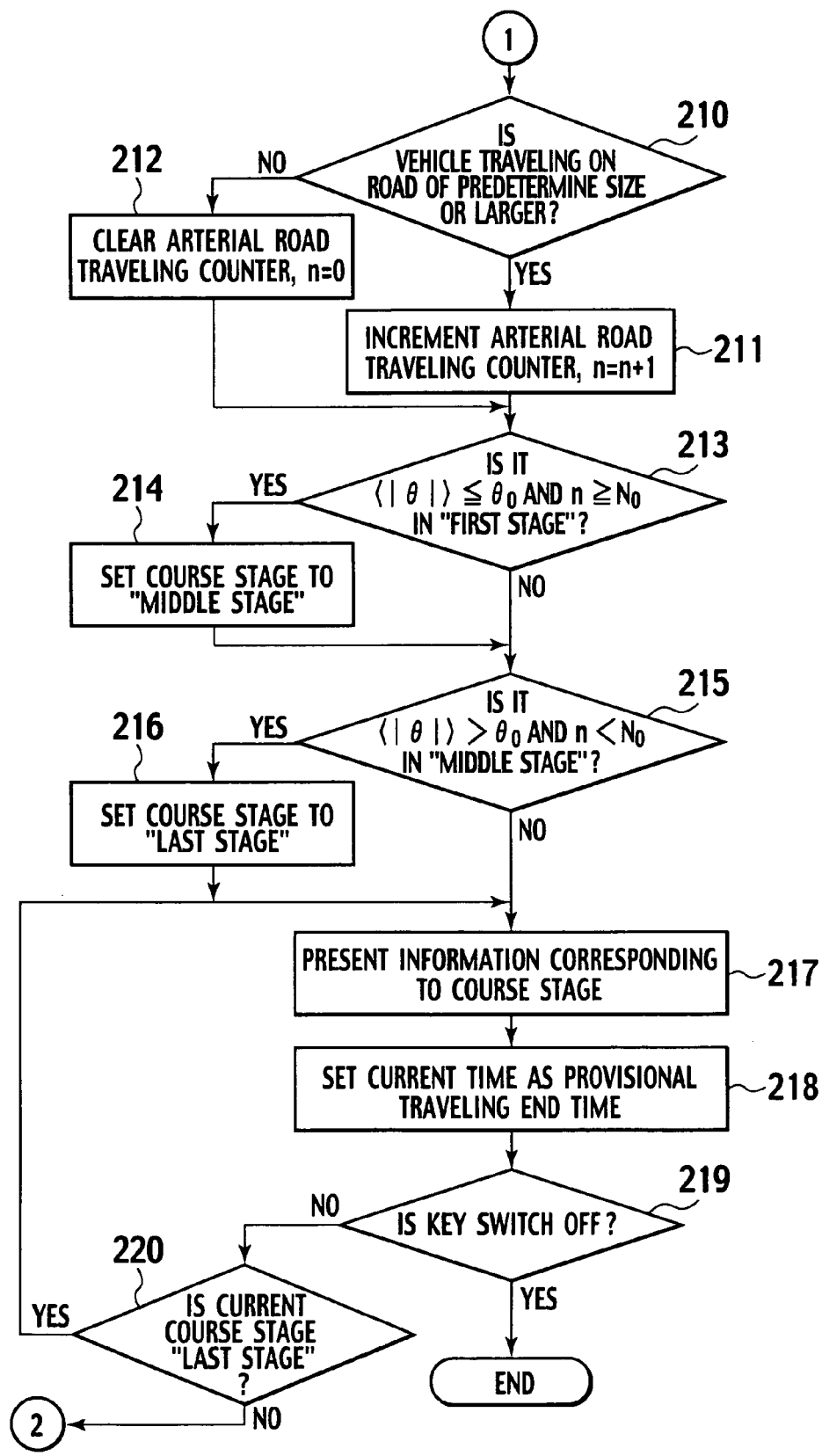
FIG. 9 is a flowchart showing the control flow of presenting information corresponding to the course stage according to the second embodiment.

Next, a control flow for presenting information corresponding to a course stage according to the present embodiment will be explained with reference to FIGS. 8 and 9.

In step 201, the navigation device 50' starts when the key switch 4 is turned ON, whereupon the ignition ON is detected. Then, the course stage prediction unit 16' acquires the current time from the clock unit 12.

In step 202, the course stage prediction unit 16' acquires from the temporal storage unit 3', the previous traveling end time and course stage that are stored immediately before the ignition is turned OFF for the last time.

In step 203, the course stage prediction unit 16' calculates the time elapsed now since the acquired previous traveling end time, and checks whether the elapsed time is a predetermined period of time or longer. For example, when the elapsed time is 1 hour or more, the course stage prediction unit 16' determines that the traveling now started is new, and the process proceeds to step 204. When the elapsed time is less than 1 hour, the course stage prediction unit 16' determines that a rest is taken in the middle of the travel course, and the process proceeds to step 207.

In step 204, the course stage prediction unit 16' sets the course stage to the "first stage" and stores this "first stage" in the temporal storage unit 3'.

In step 205, the course stage prediction unit 16' clears the buffer that stores the advancing azimuth angle $\phi$ and the displacement angle $\theta$.

In step 206, the course stage prediction unit 16' clears the arterial road traveling counter n to zero (n=0). After the step 206 is performed, the process proceeds to step 207.

In step 207, the advancing direction displacement measurement unit 13 acquires the advancing azimuth angle $\phi$ from the current position calculation unit 11, then calculates a displacement angle $\theta$ from the newly acquired advancing azimuth angle $\phi$ and the previously acquired advancing azimuth angle $\phi$, and stores the calculated displacement angle $\theta$ into the buffer.

Figures 10A, 10B:
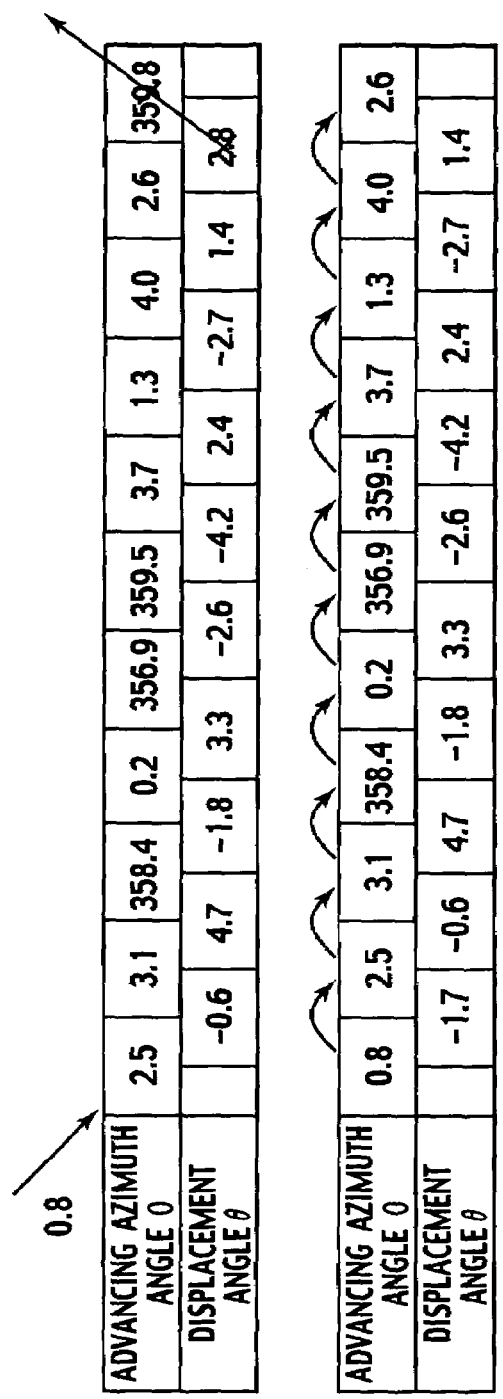
FIGS. 10A and 10B are explanatory diagrams showing that advancing azimuth angles $\phi$ and displacement angles $\theta$ are stored in a buffer.

FIG. 10A shows examples of data of the advancing azimuth angle $\phi$ and the displacement angle $\theta$ stored in the buffer.

Here, the advancing azimuth angle $\phi$ of the vehicle is defined as 0° when traveling toward true north, and is expressed by values of angles ranging from 0° to 360° clockwise from true north. The values of the advancing azimuth angle $\phi$ in the drawing are the previous eleven sampling results, and the sampling result indicated in the leftmost box is the latest and the sampling result indicated in the rightmost box is the oldest. Indicated in the lower part are the previous ten displacement angles $\theta$ each representing a difference value between the acquired two advancing azimuth angles $\phi$. The displacement angle $\theta$ is expressed by values larger than −180° and no more than 180°. Therefore, a displacement angle $\theta$ obtained when the advancing azimuth angle $\phi$ changes from 358.4° to 3.1° is not −355.3° but 4.7°.

The buffer takes a form of a ring buffer to always store the latest eleven values of the advancing azimuth angle $\phi$.

For example, when the value of 0.8° is newly acquired as the advancing azimuth angle $\phi$, the oldest data in the buffer of the advancing azimuth angle 359.8° and displacement angle 2.8° are discarded, and the existing data values are moved rightward to their next boxes as shown in FIG. 10B. Then, the value of 0.8° is written into the leftmost box of the advancing azimuth angle $\phi$, and the difference value of −1.7° obtained from the written value of 0.8° and the value of the previous advancing azimuth angle is written into the leftmost box of the displacement angle.

In step 208, the advancing direction displacement measurement unit 13 calculates an average value of the absolute values of the previous ten displacement angles $\theta$ accumulated in the buffer, and outputs this average value to the course stage prediction unit 16'.

In step 209, the route maintaining state determination unit 15 retrieves road link data in the map information storage unit 2 based on the current position of the vehicle calculated by the current position calculation unit 11, and acquires a road type of the road link on which the vehicle is currently traveling.

In step 210, the route maintaining state determination unit 15 determines whether the vehicle is currently traveling on a road of the predetermined size or larger based on the acquired road type. For example, when the acquired road type is a highway or a national road, the vehicle is determined to be traveling on a road of the predetermined size or larger.

When the vehicle is traveling on a road of the predetermined size or larger, the process proceeds to step 211, and otherwise proceeds to step 212.

In step 211, the route maintaining state determination unit 15 increments the arterial road traveling counter n (n=n+1), and stores the counter value in the temporal storage unit 3'. After the step 211 is performed, the process proceeds to step 213.

In step 212, the route maintaining state determination unit 15 clears the arterial road traveling counter n to zero (n=0), and stores the counter value in the temporal storage unit 3'. After the step 212 is performed, the process proceeds to step 213.

In step 213, the course stage prediction unit 16' checks whether the course stage is the "first stage", and simultaneously checks whether both a condition that the average value of the absolute values of the displacement angle $\theta$ is a predetermine value $\theta$o or less and a condition that the value of the arterial road traveling counter n is No or above are met. When the both conditions are not met at the same time, the process proceeds to step 215. When the both conditions are met at the same time, the process proceeds to step 214, and the course stage prediction unit 16' sets the course stage to the "middle stage" and stores this "middle stage" in the temporal storage unit 3'. After the step 214 is performed, the process proceeds to step 215.

In step 215, the course stage prediction unit 16' checks whether the course stage is the "middle stage", and simultaneously checks whether both a condition that the average value of the absolute values of the displacement angle $\theta$ is larger than the predetermined value $\theta$o and a condition that the value of the arterial road traveling counter n is less than No are met at the same time. When the both conditions are not met at the same time, the process proceeds to step 217, and when the both conditions are met at the same time, the process proceeds to step 216, and the course stage prediction unit 16' sets the course stage to the "last stage" and stores this "last stage" in the temporal storage unit 3'. After the step 216 is performed, the process proceeds to step 217.

In step 217, the presenting information controller 17 presents information corresponding to the course stage to the driver by using the display 5 and the speaker 6, similarly to the first embodiment.

In step 218, the course stage prediction unit 16' writes the current time obtained from the clock unit 12 as a provisional traveling end time into the temporal storage unit 3'.

In step 219, the CPU 1' checks whether the ignition is turned OFF by the key switch 4. When the ignition is turned OFF, the navigation device 50' is stopped. When the ignition is not turned OFF, the process proceeds to step 220.

In step 220, the course stage prediction unit 16' checks whether the current course stage is the "last stage". When the current course stage is not the "last stage", the process returns to step 207 and a series of course stage prediction processes and the control for presenting information corresponding to the predicted course stage to the driver are continued. When the current course stage is the "last stage", the process proceeds to step 217 and the course stage prediction processes are omitted. When the navigation device 50' is stopped because the ignition is turned OFF, the latest provisional traveling end time stored in the temporal storage unit 3' in step 218 is used as a proper traveling end time.

Thus, when the vehicle changes a driving road from a small size road (country road, municipal road, or prefectural road) to a large size road (highway or national road) in the "first stage" after the departure and continues to travel on the large size road for a while, the average value of the absolute values of the displacement angle θ accumulated in the buffer decreases to or below the predetermined value θo as a result of the repetitive processes from step 207 to step 220, and further the value of the arterial road traveling counter n is increasingly incremented at steps 210 and 211 and consequently becomes the predetermined value No or more. As a result, the course stage is set to the "middle stage" at steps 213 and 214.

When the vehicle approaches the destination while the course stage is set to the "middle stage" and changes in the advancing direction become large because the vehicle is running on a small size road, the average value of the absolute values of the displacement angle θ accumulated in the buffer becomes larger than the predetermined value θo. Also, when the vehicle moves onto a small size road, the value of the arterial road traveling counter n is once cleared to zero in steps 210 and 212. Near the destination, the vehicle may run on a national road for some time, but may not travel thereon for a long time to the extent that the arterial road traveling counter n is continuously incremented. Therefore, the arterial road traveling counter n shows a value less than the predetermined value No. As a result, the course stage is set to the "last stage" in steps 215 and 216.

Even when the vehicle stops to make a short-term stop at any course stage, the course stage prediction unit 16' determines that the previous travel course still continues if the engine is started within 1 hour, and uses the course stage before the engine is stopped, the advancing azimuth angle and displacement angle, and the data of the arterial road traveling counter that are stored in the temporal storage unit, in order to predict subsequent course stages. Therefore, information corresponding to the course stage can be presented properly to the driver.

For example, even when the vehicle is started after the driver takes a rest at a rest area on the highway, the course stage remains set to the "middle stage" and the data of the advancing azimuth angle and displacement angle and the arterial road traveling counter n are not cleared, so that the data before taking the rest is taken over and used.

In the flowchart of the present embodiment, the steps 207 to 212 constitute the travel state acquisition means of the present invention, the step 218 constitutes the traveling end time storage means of the present invention, and the steps 202 to 206 and steps 213 to 216 constitute the course stage prediction means of the present invention.

As described above, according to the present embodiment, even when the driver drives a long distance without setting the guidance route, the navigation device can automatically predict whether the course stage is the "first stage", the "middle stage", or the "last stage", and can switchably control information to be presented by the display 5 or the speaker 6 according to driver's convenience at every course stage, similarly to the case in the first embodiment. Therefore, even when the driver does not make route setting, information is presented in a controlled manner based on the automatic prediction of the course stage, which conveniently eliminates troublesome operations by the driver to switch contents of displayed information Furthermore, similarly to the first embodiment, the course stage prediction unit 16' calculates the amount of time during which the vehicle is stopped, thereby determining upon start of the engine, whether a new travel course is started or the previous travel course still continues. Therefore, the prediction of the course stage is not affected even when the vehicle makes a short-term stop.

Moreover, according to the present embodiment, unlike the first embodiment, the continuous driving time is not compared with the course stage transition determination reference time to determine transitions from the "first stage" to the "middle stage" and to the "last stage", but the transitions are determined according to the size of the road on which the vehicle is traveling and changes in the advancing azimuth angle φ. Therefore, even when it takes a long time to pass through traffic congestion at an interchange of a highway in the "first stage", or even when it takes a long time to pass through traffic congestion that occurs on a highway for some reasons in the "middle stage", the course stage can be predicted more accurately than in the case of the first embodiment.

Next, a third embodiment of the present invention will be explained. The third embodiment is a combination of the first and the second embodiments.

The third embodiment is explained with reference to the block diagram of the configuration of the navigation device according to the second embodiment.

A navigation device 50" according to the present embodiment has a CPU 1" and a temporal storage unit 3" that are different from those in the second embodiment. The CPU 1" includes the components in the second embodiment and additionally includes a continuous driving time measurement unit 14, and the course stage prediction unit 16' is replaced with a course stage prediction unit 16".

Like parts as in the second embodiment are designated with like reference signs, therefore descriptions therefor will be omitted, but the CPU 1' is rewritten as a CPU 1", the temporal storage unit 3' as a temporal storage unit 3", the course stage prediction unit 16' as a course stage prediction unit 16", and the navigation device 50' as the navigation device 50".

The temporal storage unit 3" stores a traveling start time, and a time immediately before the ignition is turned OFF by the key switch 4 as a traveling end time, and also stores a course stage set by the course stage prediction unit 16". The temporal storage unit 3" further stores data of the advancing azimuth angle φ sampled by the advancing direction displacement measurement unit 13, data of the displacement angle θ that is a difference between two advancing azimuth angles φ, and a value of the arterial road traveling counter counted by the route maintaining state determination unit 15. In addition, the temporal storage unit 3" stores a criterion θo for the displacement angle that is used by the course stage prediction unit 16" and a criterion No for the value of the arterial road traveling counter.

The continuous driving time measurement unit 14 measures time elapsed from the traveling start time using the traveling start time and the current time obtained from the clock unit 12.

The course stage prediction unit 16" calculates elapsed time from a difference between the traveling end time stored immediately before the ignition is turned OFF for the last time and the current time when the ignition is now turned ON, and determines whether a new travel course is started or a short-term stop is made.

Furthermore, the course stage prediction unit 16" selects the first transition determination reference time and the second transition determination reference time based on the traveling start time, similarly to the case of the first embodiment, in order to determine whether the continuous driving time exceeds those transition determination reference times. In addition, the course stage prediction unit 16" determines whether the course stage is the "first stage", the "middle stage", or the "last stage", by combining the determinations based on the average value of the absolute values of the displacement angle θ obtained for a predetermined period of time and the value of the arterial road traveling counter.

Figure 11:
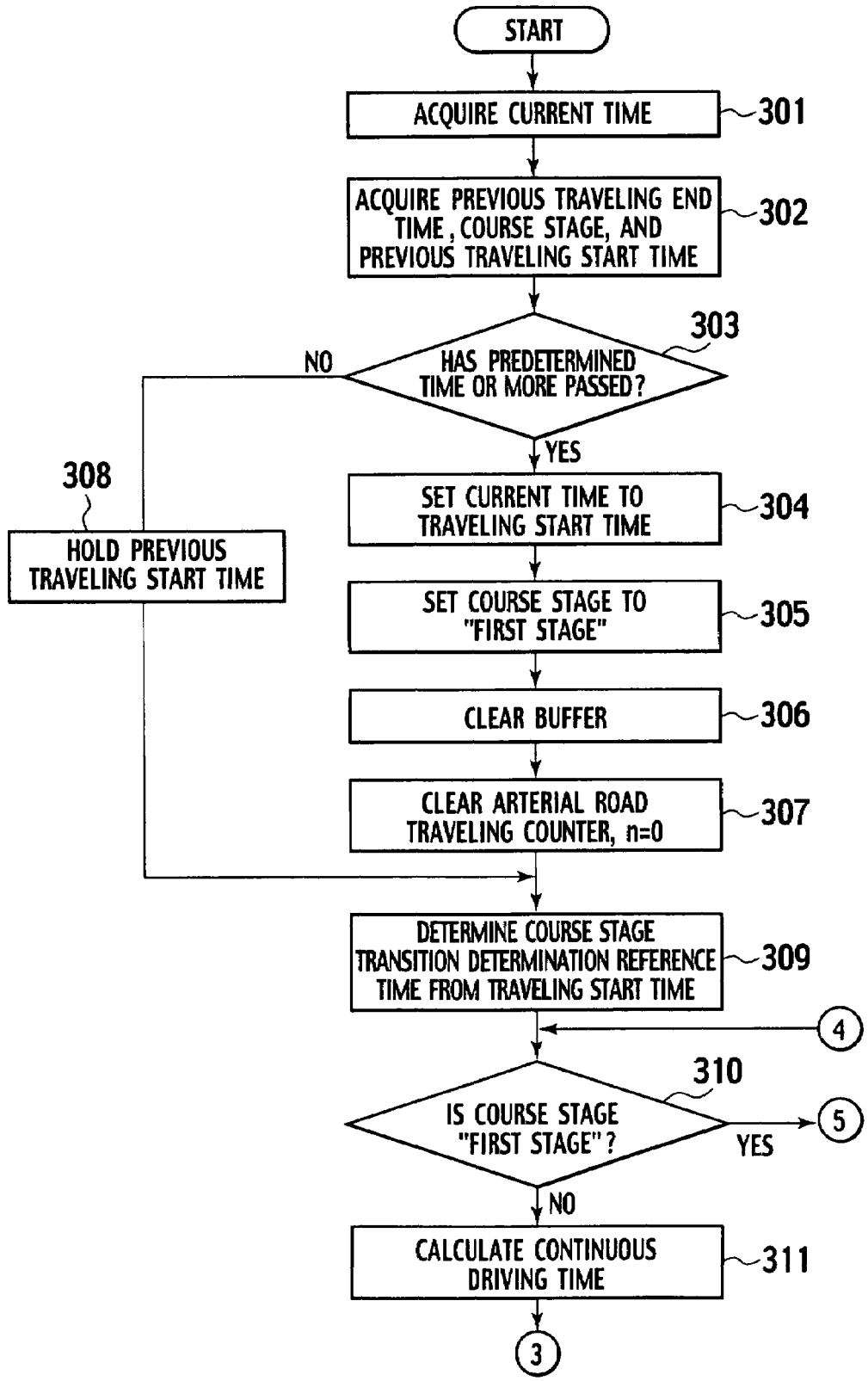
FIG. 11 is a flowchart showing a control flow of presenting information corresponding to a course stage according to a third embodiment.
Figure 12:
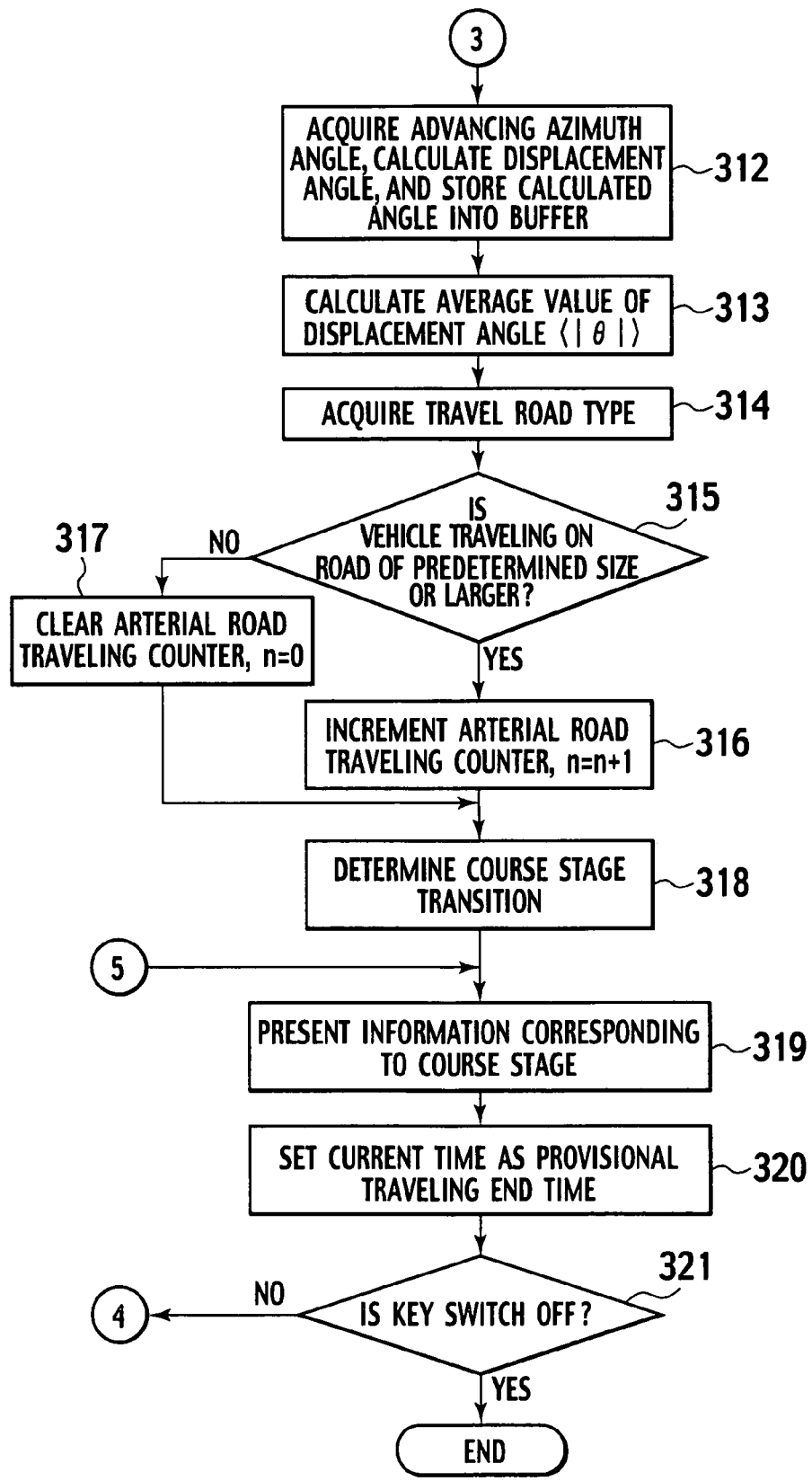
FIG. 12 is a flowchart showing the control flow of presenting information corresponding to the course stage according to the third embodiment.

Next, a control flow for presenting information corresponding to a course stage according to the present embodiment will be explained with reference to FIGS. 11 and 12.

In step 301, the navigation device 50" is started when the key switch 4 is turned ON, whereupon the ignition ON is detected. Then, the course stage prediction unit 16" acquires the current time from the clock unit 12.

In step 302, the course stage prediction unit 16" acquires from the temporal storage unit 3", the previous traveling end time stored immediately before the ignition is turned OFF for the last time, the course stage, and the previous traveling start time.

In step 303, the course stage prediction unit 16" calculates the time elapsed now since the acquired previous traveling end time and checks whether the elapsed time is a predetermined time or longer. For example, when the elapsed time is 1 hour or more, the course stage prediction unit 16" determines that the traveling now started is new, and the process proceeds to step 304. When the elapsed time is less than 1 hour, the course stage prediction unit 16" determines that a rest is taken in the middle of the travel course, and the process proceeds to step 308.

In step 304, the course stage prediction unit 16" sets the current time to a traveling start time, and stores this traveling start time in the temporal storage unit 3".

In step 305, the course stage prediction unit 16" sets the course stage to the "first stage" and stores this "first stage" in the temporal storage unit 3".

In step 306, the course stage prediction unit 16" clears the buffer that stores the advancing azimuth angle φ and the displacement angle θ.

In step 307, the course stage prediction unit 16" clears the arterial road traveling counter n to zero (n=0). After this step 307 is performed, the process proceeds to step 309.

When the process proceeds from step 303 to step 308, the course stage prediction unit 16" remains holding the previous traveling start time acquired from the temporal storage unit 3" as a proper traveling start time. After step 308 is performed, the process proceeds to step 309.

In step 309, the course stage prediction unit 16" determines which of the course stage transition determination reference times is to be used, based on the traveling start time set in step 304 or step 308 and the criteria data shown in FIG. 2.

In step 310, the course stage prediction unit 16" checks whether the current course stage is set to the "last stage". When the course stage is set to the "last stage", the process proceeds to step 319. When the course stage is not set to the "last stage", the process proceeds to step 311.

In step 311, the continuous driving time measurement unit 14 acquires the current time from the clock unit 12 at every moment, and calculates the continuous driving time elapsed since the traveling start time.

In step 312, the advancing direction displacement measurement unit 13 acquires the advancing azimuth angle φ from the current position calculation unit 11, and calculates a displacement angle θ from the newly acquired advancing azimuth angle φ and the previous advancing azimuth angle φ to store the calculated displacement angle in the buffer.

In step 313, the advancing direction displacement measurement unit 13 calculates an average value of the absolute values of the previous ten displacement angles φ accumulated in the buffer, and outputs the calculated average value to the course stage prediction unit 16'.

In step 314, the route maintaining state determination unit 15 acquires a road type of the road link on which the vehicle is currently traveling.

In step 315, the route maintaining state determination unit 15 determines whether the vehicle is traveling on a road of the predetermined size or larger, based on the acquired road type. Here, the vehicle is determined to be traveling on a road of the predetermined size or larger if, for example, the road type is a highway or a national road. When the vehicle is traveling on a road of the predetermined size or larger, the process proceeds to step 316, and otherwise proceeds to step 317.

In step 316, the road maintaining state determination unit 15 increments the arterial road traveling counter n (n=n+1), and stores the counter value in the temporal storage unit 3". After the step 316 is performed, the process proceeds to step 318.

In step 317, the route maintaining state determination unit 15 clears the arterial road traveling counter n to zero (n=0), and stores the counter value in the temporal storage unit 3". After the step 317 is performed, the process proceeds to step 318.

In step 318, the course stage prediction unit 16" determines whether the course stage is to be shifted to the next stage. A detailed method for this determination will be explained later with reference to the flowcharts shown in FIGS. 13 and 14.

In step 319, similarly to the first embodiment, the presenting information controller 17 presents information corresponding to the course stage to the driver by using the display 5 and the speaker 6.

In step 320, the course stage prediction unit 16" writes the current time obtained from the clock unit 12 as a provisional traveling end time in the temporal storage unit 3".

In step 321, the CPU 1" checks whether the ignition is turned OFF by the key switch 4. When the ignition is turned OFF, the navigation device 50" is stopped. When the ignition is not turned OFF, the process returns to step 310, and then a series of course stage prediction processes and the control for presenting information corresponding to the predicted course stage to the driver are continued. When the navigation device 50" is stopped because the ignition is turned OFF, the latest provisional traveling end time written into the temporal storage unit 3" in step 320 is used as a proper traveling end time.

Figure 13:
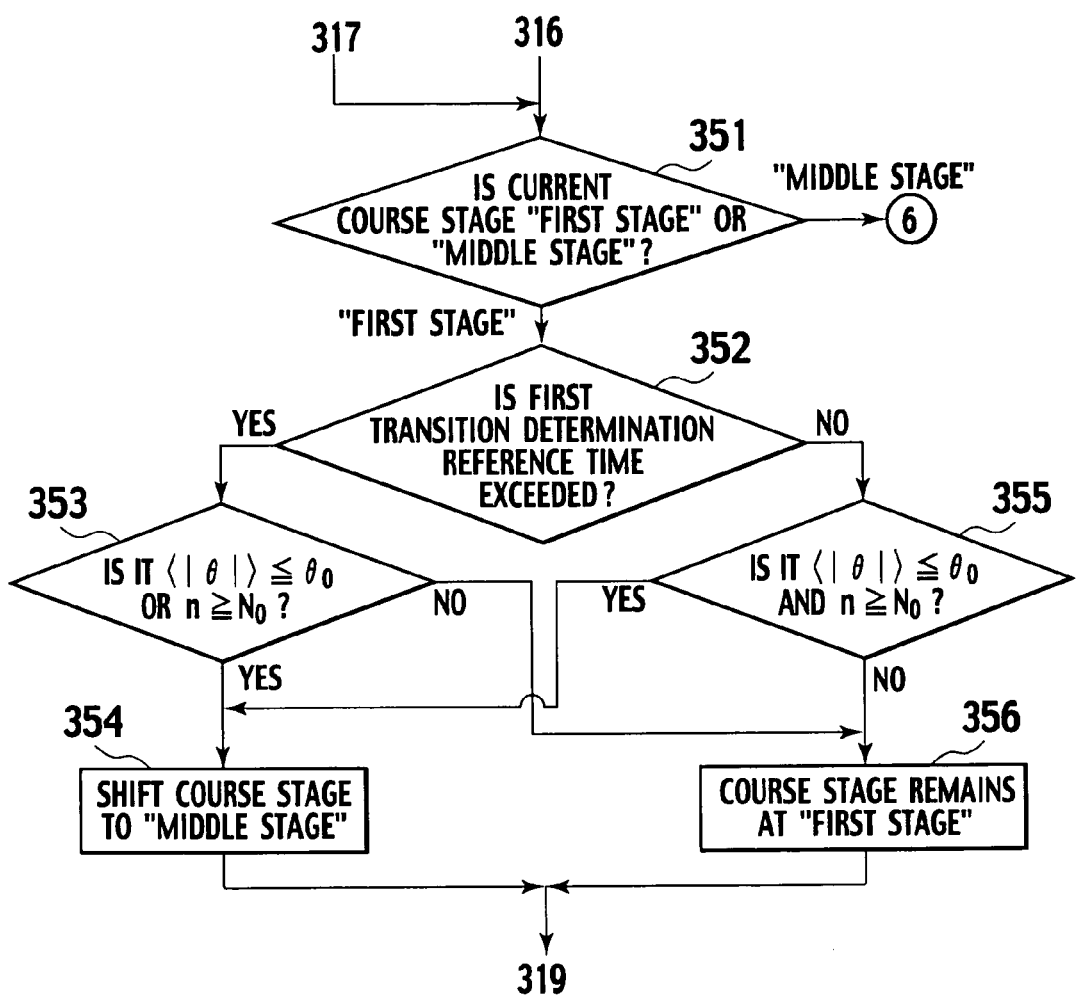
FIG. 13 is a flowchart showing a control flow of determining course stage transition according to the third embodiment.
Figure 14:
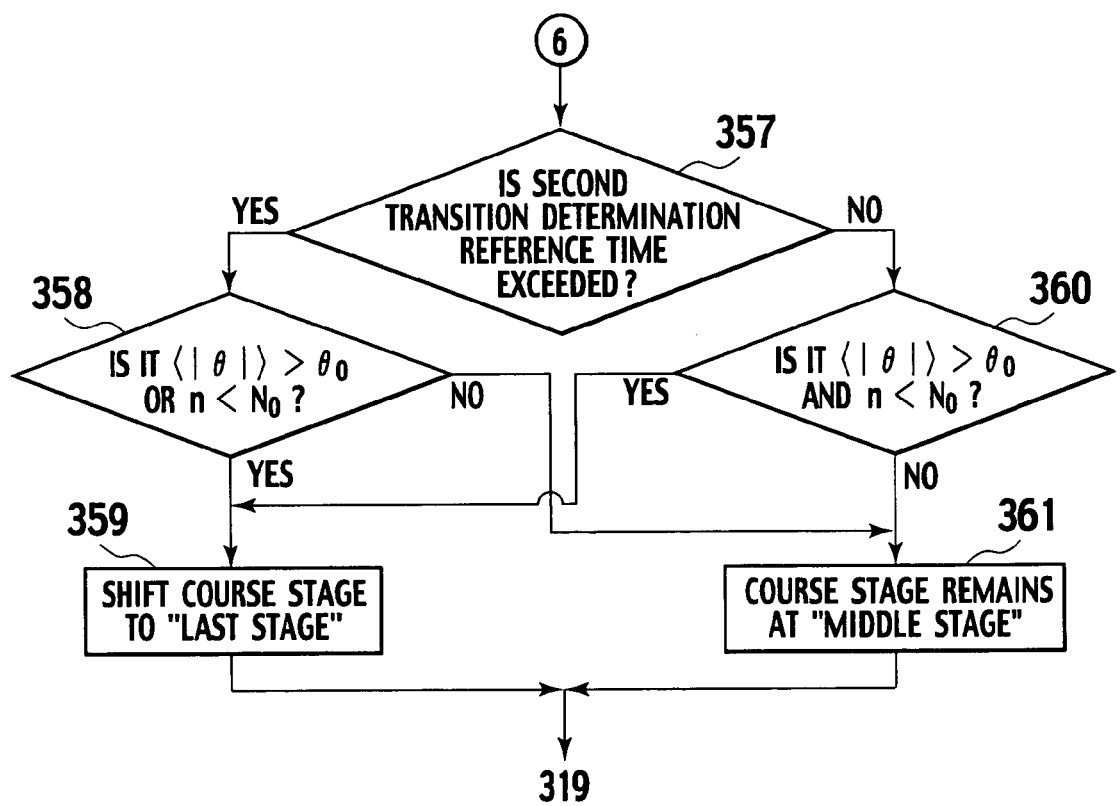
FIG. 14 is a flowchart showing the control flow of determining course stage transition according to the third embodiment.

Next, the detailed method for determining transition to the next course stage by the course stage prediction unit 16" in step 318 will be explained with reference to FIGS. 13 and 14.

In step 351, the course stage prediction unit 16" checks whether the currently set course stage is the "first stage" or the "middle stage". When it is the "first stage", the process proceeds to step 352, and when it is the "middle stage", the process proceeds to step 357.

In step 352, the course stage prediction unit 16" checks whether the continuous driving time exceeds the first transition determination reference time (reference time period for determining transition from the "first stage" to the "middle stage"). When the first transition determination reference time is exceeded, the process proceeds to step 353, and when the first transition determination reference time is not exceeded, the process proceeds to step 355.

In step 353, the course stage prediction unit 16" checks whether at least one of a condition that the average value of the absolute values of the displacement angle θ is the predetermined value θo or below and a condition that the value of the arterial road traveling counter n is No or above is met. When at least one of these conditions is met, the process proceeds to step 354. When neither of these conditions is met, the process proceeds to step 356.

When the process proceeds from step 352 to step 355, the course stage prediction unit 16" checks whether both the condition that the average value of the absolute values of the displacement angle θ is the predetermined value θo or below and the condition that the value of the arterial road traveling counter n is No or above are met at the same time. When the both conditions are met, the process proceeds to step 354, and when one of the both conditions is not met, the process proceeds to step 356.

In step 354, the course stage prediction unit 16" shifts the course stage to the "middle stage", and stores this "middle stage" in the temporal storage unit 3". In step 356, the course stage remains set to the "first stage". After steps 354 and 356 are performed, the process proceeds to step 319.

When the process proceeds from step 351 to step 357, the course stage prediction unit 16" checks whether the continuous driving time exceeds the second transition determination reference time (reference time period for determining transition from the "middle stage" to the "last stage"). When the second transition determination reference time is exceeded, the process proceeds to step 358, and when not exceeded, the process proceeds to step 360.

In step 358, the course stage prediction unit 16" checks whether at least one of a condition that the average value of the absolute values of the displacement angle θ is larger than the predetermined value θo and a condition that the value of the arterial road traveling counter n is less than No is met. When at least one of these conditions is met, the process proceeds to step 359. When neither of these conditions is met, the process proceeds to step 361.

When the process proceeds from step 357 to step 360, the course stage prediction unit 16" checks whether both of the condition that the average value of the absolute values of the displacement angle θ is larger than the predetermined value θo and the condition that the value of the arterial road traveling counter n is less than No are met at the same time. When the both conditions are met, the process proceeds to step 359, and when one of the both conditions is not met, the process proceeds to step 361.

In step 359, the course stage prediction unit 16" shifts the course stage to the "last stage" and stores this "last stage" in the temporal storage unit 3". In step 361, the course stage remains set to the "middle stage". After steps 359 and 361 are performed, the process proceeds to step 319.

In this course stage transition determination according to the present embodiment, when the process proceeds to steps 352 and 353 and the continuous driving time exceeds the first transition determination reference time, the course stage is shifted from the "first stage" to the "middle stage" if either one of the condition that the average value of the absolute values of the displacement angle θ is the predetermined value θo or below and the condition that the value of the arterial road traveling counter n is the predetermined value No or above is met. Therefore, even when the vehicle is not continuously traveling on an almost straight road or a road of the predetermined size or larger in the "middle stage", a flexible course stage prediction can be performed.

Furthermore, in steps 352 and 355, even when the continuous driving time does not exceed the first transition determination reference time, the course stage is shifted from the "first stage" to the "middle stage" if both the condition that the average value of the absolute values of the displacement angle θ is the predetermined value θo or below and the condition that the value of the arterial road traveling counter n is the predetermined value No or above are met at the same time. Therefore, unlike the first embodiment in which only the first transition determination reference time is used to shift the course stage from the "first stage" to the "middle stage", a flexible course stage prediction can be performed.

When the course stage is the "middle stage", the process proceeds to steps 357 and 358 or steps 357 and 360, and the course stage is flexibly shifted from the "middle stage" to the "last stage".

In the flowchart of the present embodiment, the step 311 and the steps 312 to 317 constitute the traveling state acquisition means, the step 320 constitutes the traveling end time storage means of the present invention, and the steps 303 to 309 and step 318 constitute the course stage prediction means.

As described above, according to the present embodiment, even when the vehicle runs a long distance without setting any guidance route, the navigation device can automatically predict whether the course stage is the "first stage", the "middle stage", or the "last stage", and can switchably control information to be presented by the display 5 or the speaker 6 according to driver's convenience at each course stage, similarly to the case in the first embodiment. Therefore, when the driver does not make route settings, information is presented in a controlled manner based on the automatic prediction of the course stage, which conveniently eliminates troublesome operations by the driver to switch contents of displayed information.

Furthermore, similarly to the first embodiment, the course stage prediction unit 16" calculates the amount of time during which the vehicle is stopped, thereby determining upon start of the engine, whether a new travel course is started or the previous travel course still continues. Therefore, the prediction of course stages is not affected even when the vehicle makes a short-term stop.

Moreover, according to the present embodiment, unlike the first embodiment, the continuous driving time is not compared with the course stage transition determination reference time to determine transitions from the "first stage" to the "middle stage" and to the "last stage", but the transitions are determined according to the size of the road on which the vehicle is traveling and changes in the advancing azimuth angle φ. Therefore, even when it takes a long time to pass through traffic congestion at an interchange of a highway in the "first stage", or even when it takes a long time to pass through traffic congestion that occurs on a highway for some reasons in the "middle stage", the course stage can be predicted more accurately than in the case of the first embodiment.

Furthermore, since the determination of the traveling stage transition is made based on a combination of the size of the road on which the vehicle is traveling and the changes in the advancing azimuth angle φ, the course stage can be flexibly predicted to be the "first stage", the "middle stage", or the "last stage", even when, for example, the criteria for both the road size and the changes in the advancing azimuth angle φ are not met at the same time because the vehicle is actually in the "middle stage" but running on a prefectural road or a national road having many curves and therefore the transition from the "first stage" to the "middle stage" cannot be determined in the second embodiment.

In the process of the calculation of the continuous driving time in the first or the third embodiment, a short parking duration spent for a rest may be deducted from the continuous driving time. This can prevent a transition of the course stage caused by the elapse of nominal continuous driving time.

Next, a modification example of the first and the third embodiments will be explained. In this modification example, instead of the continuous driving time used by the course stage prediction unit 16 (16"), a distance from the departure point is used. The CPU 1 (1") includes a travel distance measurement unit that integrates a wheel speed signal from the speed sensor 8 and converts it to a travel distance, and further includes a driving distance calculation unit.

The driving distance calculation unit stores a travel distance at a traveling start time into the temporal storage unit 3 (3"), and acquires a travel distance at the current time while the vehicle is traveling, thereby calculating a driving distance that is a difference between the travel distance at the traveling start time and the travel distance at the current time and outputting the calculated driving distance to the course stage prediction unit 16 (16"). The course stage prediction unit 16 (16") predicts a course stage according to a first transition determination reference distance for transition from the "first stage" to the "middle stage" and a second transition determination reference distance for transition from the "middle stage" to the "last stage", which are set in advance for several traveling start times.

Figure 3:
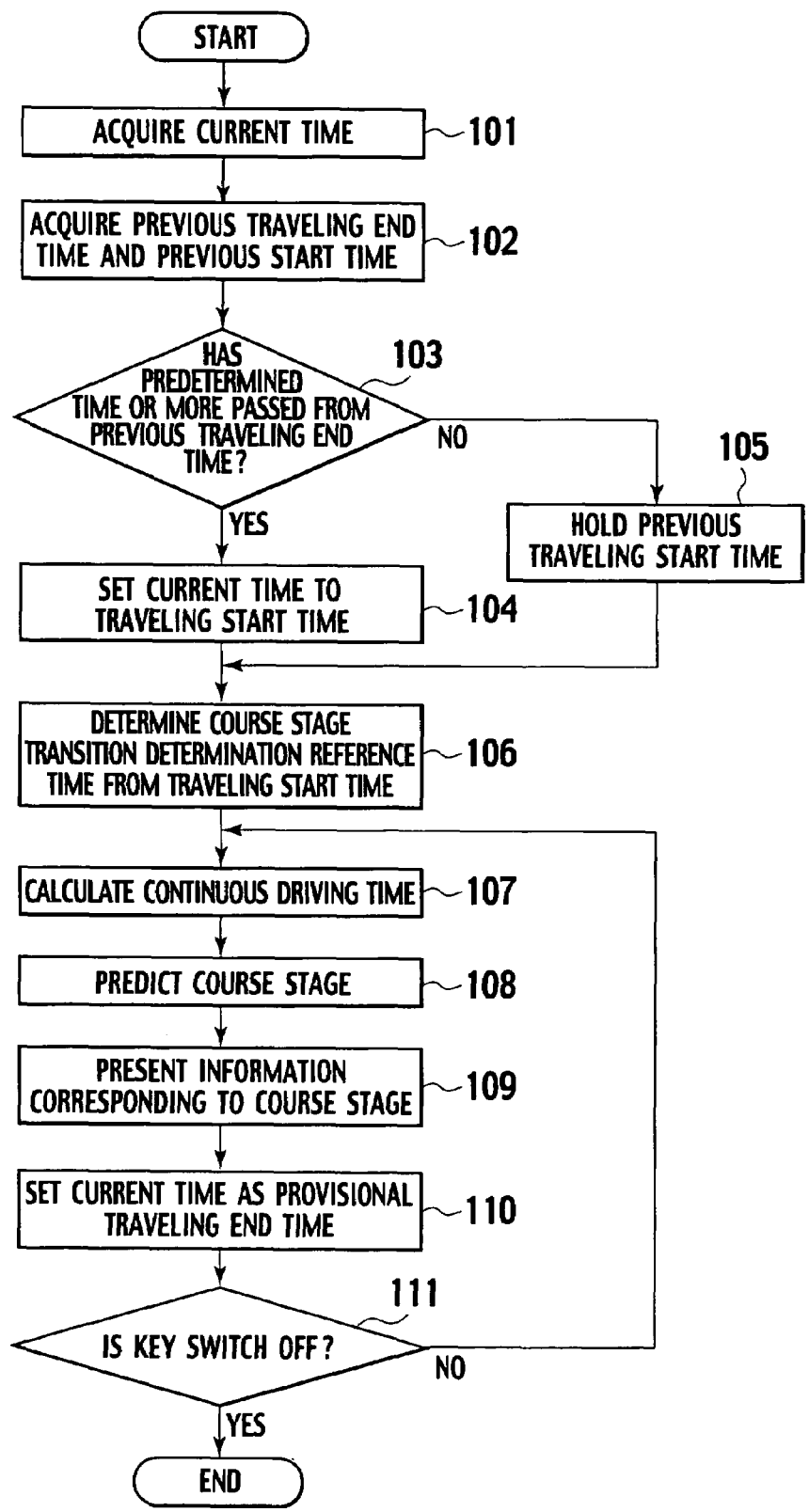
FIG. 3 is a flowchart showing a control flow of presenting information corresponding to a course stage according to the first embodiment.

In the modification example according to the first embodiment, the continuous driving time measurement unit 14 shown FIG. 1 is replaced with the driving distance calculation unit, the step 106 in FIG. 3 is replaced with "determine course stage transition determination reference distance from traveling start time", and the step 107 in FIG. 3 is replaced with "calculate distance from departure point". Similarly, in the modification example according to the third embodiment, the continuous driving time measurement unit 14 shown in FIG. 7 is replaced with the driving distance calculation unit, the step 309 in FIG. 11 is replaced with "determine course stage transition determination reference distance from traveling start time", the step 311 in FIG. 11 is replaced with "calculate distance from departure point", the step 352 is replaced with "is first transition determination reference distance exceeded?", and the step 357 is replaced with "is second transition determination reference distance exceeded?".

Thus, when the criteria for course stage transition based on a travel distance from a departure point is used instead of the criteria for course stage transition based on a continuous diving time, the same advantageous effect as in the first or the third embodiment can be obtained. Particularly as to the continuous driving time, it is not necessary to perform processing such as deducting therefrom the short parking duration spent for a rest.

Furthermore, in the second embodiment, the condition for determining transition from the "first stage" to the "middle stage" in step 213 of the flowchart is that the average value of the absolute values of the displacement angle θ is the predetermined value θo or below and simultaneously the value of the arterial road traveling counter n is No or above in "the first stage", and also the condition for determining transition from the "middle stage" to the "last stage" in step 215 of the flowchart is that the average value of the absolute values of the displacement angle θ is larger than the predetermined value θo and simultaneously the value of the arterial road traveling counter n is less than No in the "middle stage". Conditions for determining the course stage transition are, however, not limited to the above.

More broadly, another condition may be set in step 213 in the flowchart such that the average value of the absolute values of the displacement angle θ is the predetermined value θo or below or the value of the arterial road traveling counter n is No or above in the "first stage", and also another condition may be set in step 215 in the flowchart such that the average value of the absolute values of the displacement angle θ is larger than the predetermined value θo or the value of the arterial road traveling counter n is less than No in the "middle stage.

Moreover, in the route maintaining state determination unit 15 of the second or the third embodiment, a road of the predetermined size or larger expected in the "middle stage" is, for example, a national road, a highway, or other types of roads having the size larger than those, but it is not limited thereto.

The road of the predetermined size or larger is not only determined based on the road type, but also may include any of highways, national roads having a width of 12 meters or more, or primary municipal roads having three lanes or more on one side, by combining road information on a map such as the road width or the number of lanes.

In the route maintaining state determination unit 15 in the second or the third embodiment, the arterial road traveling counter n is incremented by 1, but the increment amount is not limited to 1. For example, the increment amount may be differentiated depending on the road type, such as an increment of 3 for a highway, and an increment of 1 for a national road. Thus, assigning weight to the increment amount leads to quick determination by the course stage prediction unit 16 (16") that the course stage is shifted to the "middle stage", as soon as the vehicle takes the highway.

In the present invention based on the foregoing embodiments and the modification example, the determination of the course stage transition is made by comparing the continuous driving time (or a distance from the departure point), the magnitude of the displacement θ between the advancing azimuth angles, and the arterial road traveling counter n, with their respective threshold values set in advance, but the criteria for this course stage transition determination are not limited to the above.

The threshold value may be set through leaning of these parameter values and the state of each course stage.

Furthermore, the expected amount of required time (or expected travel distance) is selected from a predetermined table according to a traveling start time, and a course stage is expressed by consecutive values ranging from 0% to 100% with respect to the selected expected amount of required time, and parameters are also expressed by consecutive values normalized by the threshold value. Then, the relation between these parameters and the course stage may be defined by, for example, a fuzzy function.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of Patent Application No. TOKUGAN 2004-162227 with a filing date of May 31, 2004, is hereby incorporated by reference.

What is claimed is:

1. A navigation device that calculates a current position of a vehicle and displays a road map around the current position on a display, comprising:
   traveling state acquisition means for acquiring a parameter indicative of a current traveling state of the vehicle; and
   course stage prediction means for predicting whether the vehicle is running in a "first stage", a "middle stage", or a "last stage" of a travel course when destination and guidance settings are not made, according to the acquired parameter indicative of the current traveling state of the vehicle, wherein information is presented to a passenger in a controlled manner according to the predicted course stage.

2. The navigation device according to claim 1, wherein the parameter indicative of the current traveling state of the vehicle is at least one of a parameter of time elapsed since departure, a parameter of a distance from a departure point, a parameter of size of a road on which the vehicle is currently traveling, and a parameter of change in a traveling direction.

3. The navigation device according to claim 2, wherein the traveling state acquisition means includes a continuous driving time measurement unit that measures continuous driving time from a traveling start time, and acquires the measured continuous driving time as the parameter indicative of the time elapsed since departure,
   the course stage prediction means selects based on the traveling start time, a first transition determination reference time for transition from the "first stage" to the "middle stage" from prepared data of the first transition determination reference time, and a second transition determination reference time for transition from the "middle stage" to the "last stage" from prepared data of the second transition determination reference time, and
   the course stage prediction means predicts based on the continuous driving time, which course stage the vehicle is running in, according to the selected first transition determination reference time and the selected second transition determination reference time.

4. The navigation device according to claim 3, wherein the second transition determination reference time is set shorter as the traveling start time becomes later toward evening from early morning.

5. The navigation device according to claim 2, wherein the traveling state acquisition means includes a travel distance measurement unit and a driving distance calculation unit that measures the distance from a departure point that is obtained based on the travel distance measurement unit, and acquires the distance from a departure point as the parameter,
   the course stage prediction means selects based on the traveling start time, a first transition determination reference distance for transition from the "first stage" to the "middle stage" from prepared data of the first transition determination reference distance, and a second transition determination reference distance for transition from the "middle stage" to the "last stage" from prepared data of the second transition determination reference distance, and
   the course stage prediction means predicts based on the distance from the departure point, which course stage the vehicle is running in, according to the selected first transition determination reference distance and the selected second transition determination reference distance.

6. The navigation device according to claim 5, wherein the second transition determination reference distance is set shorter as the traveling start time becomes later toward evening from early morning.

7. The navigation device according to claim 2, wherein the traveling state acquisition means includes an advancing direction displacement measurement unit that measures a displacement angle indicating magnitude of the change in the advancing direction of the vehicle, and acquires the displacement angle as the parameter indicative of the change in the traveling direction,
   the course stage prediction means predicts that the course stage is shifted to the "middle stage" when the displacement angle is a predetermined threshold value or below in the "first stage", and predicts that the course stage is still the "first stage" when the displacement angle is not the predetermined threshold value or below, and
   the course stage prediction means predicts that the course stage is shifted to the "last stage" when the displacement angle is larger than the predetermined threshold value in the predicted "middle stage", and predicts that the course stage is still the "middle stage" when the displacement angle is not larger than the predetermined threshold value in the predicted "middle stage".

8. The navigation device according to claim 2, wherein the traveling state acquisition means includes a route maintaining state determination unit that measures arterial road traveling time during which the vehicle is running on a road of a predetermined size or larger, and acquires the arterial road traveling time as the parameter indicative of the size of the road on which the vehicle is currently traveling,
   the course stage prediction means predicts that the course stage is shifted to the "middle stage" when the arterial road traveling time is a predetermined threshold value or above in the "first stage", and predicts that the course stage is still the "first stage" when the arterial road traveling time is not the predetermined threshold value or above in the "first stage", and
   the course stage prediction means predicts that the course stage is shifted to the "last stage" when the arterial road traveling time is smaller than the predetermined threshold value in the predicted "middle stage", and predicts that the course stage is still the "middle stage" when the arterial road traveling time is not smaller than the predetermined threshold value in the predicted "middle stage".

9. The navigation device according to claim 2, wherein the traveling state acquisition means includes an advancing direction displacement measurement unit that measures a displacement angle indicating magnitude of the change in the advancing direction of the vehicle and a route maintaining state determination unit that measures arterial road traveling time during which the vehicle is running on a road of a predetermined size or larger, and acquires the displacement angle as the parameter indicative of the change in the traveling direction and further acquires the arterial road traveling time as the parameter indicative of the size of the road on which the vehicle is currently traveling, the course stage prediction means predicts that the course stage is shifted to the "middle stage" when both a condition that the displacement angle is a predetermined threshold value or below and a condition that the arterial road traveling time is a predetermined threshold value or above& are met in the "first stage", and predicts that the course stage is still the "first stage" when one of the both conditions is not met in the "first stage", and the course stage prediction means predicts that the course stage is shifted to the "last stage" when both a condition that the displacement angle is larger than the predetermined threshold value and a condition that the arterial road traveling time is smaller than the predetermined threshold value are met in the "middle stage", and predicts that the course stage is still the "middle stage" when one of the both conditions is not met in the "middle stage".

10. The navigation device according to claim 2, wherein the traveling state acquisition means includes a continuous driving time measurement unit that measures continuous driving time from the traveling start time, an advancing direction displacement measurement unit that measures a displacement angle indicating magnitude of the change in the advancing direction of the vehicle, and a route maintaining state determination unit that measures arterial road traveling time during which the vehicle is running on a road of a predetermined size or larger, the traveling state acquisition means acquires the continuous driving time as the parameter indicative of the time elapsed since departure, acquires the displacement angle as the parameter indicative of the change in the traveling direction, and acquires the arterial road traveling time as the parameter indicative of the size of the road on which the vehicle is currently traveling, the course stage prediction means selects based on the traveling start time, a first transition determination reference time for transition from the "first stage" to the "middle stage" from prepared data of the first transition determination reference time, and a second transition determination reference time for transition from the "middle stage" to the "last stage" from prepared data of the second transition determination reference time, and preliminary predicts based on the continuous driving time, which stage the vehicles is running in, according to the selected first transition determination reference time and the selected second transition determination reference time, and (1) when the course stage is determined to be the "middle stage" as a result of the preliminary prediction in the "first stage", and simultaneously when at least one of a condition that the displacement angle is a predetermined threshold value or below and a condition that the arterial road traveling time is a predetermined threshold value or above is met, the course stage prediction means predicts that the course stage is shifted to the "middle stage", and when neither of the conditions is met, the course stage prediction means predicts that the course stage is still the "first stage", (2) when the course stage is determined to be the "first stage" as a result of the preliminary prediction in the "first stage", and simultaneously when both of the condition that the displacement angle is the predetermined threshold value or below and the condition that the arterial road traveling time is the predetermined threshold value or above are met, the course stage prediction means predicts that the course stage is shifted to the "middle stage", and when one of the both conditions is not met, the course stage prediction means predicts that the course stage is still the "first stage", (3) when the course stage is determined to be the "last stage" as a result of the preliminary prediction in the predicted "middle stage", and simultaneously when at least one of a condition that the displacement angle is larger than the predetermined threshold value and a condition that the arterial road traveling time is smaller than the predetermined threshold value is met, the course stage prediction means predicts that the course stage is shifted to the "last stage", and when neither of the conditions is met, the course stage prediction means predicts that the course stage is still the "middle stage", and (4) when the course stage is determined to be the "middle stage" as a result of the preliminary prediction in the predicted "middle stage", and simultaneously when both of the condition that the displacement angle is larger than the predetermined threshold value and the condition that the arterial road traveling time is smaller than the predetermined threshold value are met, the course stage prediction means predicts that the course stage is shifted to the "last stage", and when one of the both conditions is not met, the course stage prediction means predicts that the course stage is still the "middle stage.

11. The navigation device according to claim 2, wherein the traveling state acquisition means includes a travel distance measurement unit, a driving distance calculation unit that measures the distance from a departure point that is obtained based on the travel distance measurement unit, an advancing direction displacement measurement unit that measures a displacement angle indicating magnitude of the change in the advancing direction of the vehicle, and a route maintaining state determination unit that measures arterial road traveling-time during which the vehicle is running on a road of a predetermined size or larger, the traveling state acquisition means acquires the distance from the departure point as the parameter, acquires the displacement angle as the parameter indicative of the change in the traveling direction, and acquires the arterial road traveling time as the parameter indicative of the size of the road on which the vehicle is currently traveling, the course stage prediction means selects based on the traveling start time, a first transition determination reference distance for transition from the "first stage" to the "middle stage" from prepared data of the first transition determination reference distance, and a second transition determination reference distance for transition from the "middle stage" to the "last stage" from prepared data of the second transition determination reference distance, and preliminary predicts based on the distance from the departure point, which stage the vehicle is running in, according to the selected first transition determination reference distance and the selected second transition determination reference distance, and (1) when the course stage is determined to be the "middle stage" as a result of the preliminary prediction in the "first stage", and simultaneously when at least one of a condition that the displacement angle is a predetermined threshold value or below and a condition that the arterial road traveling time is a predetermined threshold value or above is met, the course stage prediction means predicts that the course stage is shifted to the "middle stage", and when neither of the conditions is met, the course stage prediction means predicts that the course stage is still the "first stage", (2) when the course stage is determined to be the "first stage" as a result of the preliminary prediction in the "first stage", and simultaneously when both of the condition that the displacement angle is the predetermined threshold value or below and the condition that the arterial road traveling time is the predetermined threshold value or above are met, the course stage prediction means predicts that the course stage is shifted to the "middle stage", and when one of the both conditions is not met, the course stage prediction means predicts that the course stage is still the "first stage", (3) when the course stage is determined to be the "last stage" as a result of the preliminary prediction in the predicted "middle stage", and simultaneously when at least one of a condition that the displacement angle is larger than the predetermined threshold value and a condition that the arterial road traveling time is smaller than the predetermined threshold value is met, the course stage prediction means predicts that the course stage is shifted to the "last stage", and when neither of the conditions is met, the course stage prediction means predicts that the course stage is still the "middle stage", and (4) when the course stage is determined to be the "middle stage" as a result of the preliminary prediction in the predicted "middle stage", and simultaneously when both of the condition that the displacement angle is larger than the predetermined threshold value and the condition that the arterial road traveling time is smaller than the predetermined threshold value are met, the course stage prediction means predicts that the course stage is shifted to the "last stage", and when one of the both conditions is not met, the course stage prediction means predicts that the course stage is still the "middle stage".

12. The navigation device according to claim 1, wherein the course stage prediction means predicts the course stage according to a threshold value of the parameter acquired by the traveling stage acquisition means, and sets the threshold value of the parameter through learning.

13. The navigation device according to claim 1, further comprising:

traveling end time storage means for storing a traveling end time when an engine is stopped, wherein the course stage prediction means determines that current traveling is continued from previous traveling when time elapsed from the traveling end time is shorter than a predetermined period of time, and determines that the current traveling is different from the previous traveling when the time elapsed from the traveling end time is the predetermined period of time or longer, according to an engine start-up time.

14. A method of presenting information corresponding to a course stage in a navigation device that calculates a current position of a vehicle and displays a road map around the current position on a display, the method comprising the steps of:

acquiring information of at least one of parameters indicative of a current traveling state of the vehicle, the parameters including a parameter of time elapsed since departure, a parameter of a distance from a departure point, a parameter of size of a road on which the vehicle is currently traveling, and a parameter of change in a traveling direction of the vehicle;

predicting whether the vehicle is running in a "first stage", a "middle stage", or a "last stage" in the travel course when destination and guidance settings are not made, according to the acquired parameter indicative of the current traveling state of the, vehicle; and presenting information to a passenger according to the predicted course stage.

* * * * *